United States Patent
Okisu et al.

(10) Patent No.: US 6,571,022 B2
(45) Date of Patent: *May 27, 2003

(54) IMAGE PROCESSING APPARATUS FOR GENERATING A SINGLE IMAGE OF AN OBJECT USING OVERLAPPING PARTIAL IMAGES

(75) Inventors: Noriyuki Okisu, Osakasayama (JP); Shinichi Fujii, Amagasaki (JP); Mutsuhiro Yamanaka, Takatsuki (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,141

(22) Filed: Aug. 6, 1998

(65) Prior Publication Data
US 2001/0033701 A1 Oct. 25, 2001

(30) Foreign Application Priority Data

Aug. 6, 1997 (JP) .............................................. 9-212127
Aug. 6, 1997 (JP) .............................................. 9-212128
Aug. 6, 1997 (JP) .............................................. 9-212129

(51) Int. Cl.$^7$ ............................................. H04N 5/232
(52) U.S. Cl. ....................................... 382/294; 382/293
(58) Field of Search ................................ 382/294, 293, 382/300, 284; 358/450

(56) References Cited

U.S. PATENT DOCUMENTS 5,386,228 A    1/1995   Okino ......................... 348/218

FOREIGN PATENT DOCUMENTS

| JP | 03-074991 A | 3/1991 |
| JP | 05-137059   | 6/1993 |
| JP | 06-141246   | 5/1994 |
| JP | 07-087370   | 3/1995 |

Primary Examiner—Thomas D. Lee
Assistant Examiner—Stephen Brinich
(74) Attorney, Agent, or Firm—Morrison & Foerster LLP

(57) ABSTRACT

An image processing apparatus is provided with: a partial image data generator for generating a plurality of partial image data pertaining to a plurality of partial images of an object respectively, one partial image being partially overlapped another partial image in a boundary portion; a boundary image data generator for generating boundary image data pertaining to the boundary portion based on image data pertaining to the respective overlapped portions; and an image synthesizer for synthesizing the plurality of partial image data by way of the generated boundary image data to generate image data pertaining to a single image of the object.

5 Claims, 26 Drawing Sheets

FIG. 5
| i \ j | 1 | 2 | 3 | --- |
|---|---|---|---|---|
| 1 | R | G | R | G |
| 2 | G | B | G | B |
| 3 | R | G | R | G |
|   | G | B | G | B |
FIG. 6
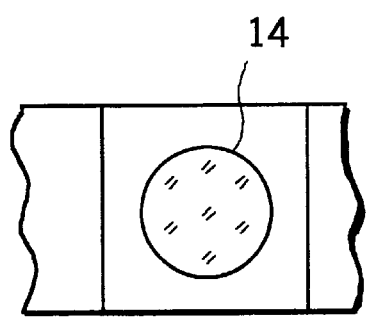
FIG. 7
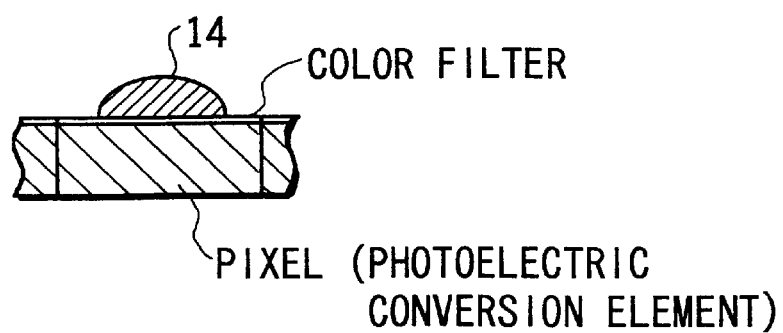

FIG. 30

| i \ j | 1 | 2 | 3 | 4 | 5 | 6 | 7 |
|---|---|---|---|---|---|---|---|
| 1 | G (1,1) | R (1,2) | G (1,3) | R (1,4) | G (1,5) | R (1,6) | G (1,7) |
| 2 | B (2,1) | G (2,2) | B (2,3) | G (2,4) | B (2,5) | G (2,6) | B (2,7) |
| 3 | G (3,1) | R (3,2) | G (3,3) | R (3,4) | G (3,5) | R (3,6) | G (3,7) |
| 4 | B (4,1) | G (4,2) | B (4,3) | G (4,4) | B (4,5) | G (4,6) | B (4,7) |
| 5 | G (5,1) | R (5,2) | G (5,3) | R (5,4) | G (5,5) | R (5,6) | G (5,7) |
| 6 | B (6,1) | G (6,2) | B (6,3) | G (6,4) | B (6,5) | G (6,6) | B (6,7) |
| 7 | G (7,1) | R (7,2) | G (7,3) | R (7,4) | G (7,5) | R (7,6) | G (7,7) |

FIG. 31

| i \ p | 1 | 2 | 3 | 4 | 5 | 6 | 7 | 8 |
|---|---|---|---|---|---|---|---|---|
| 1 |  | R |  | R |  | R |  | R |
| 2 |  |  |  |  |  |  |  |  |
| 3 |  | R |  | R |  | R |  | R |
| 4 |  |  |  |  |  |  |  |  |
| 5 |  | R |  | R |  | R |  | R |
| 6 |  |  |  |  |  |  |  |  |
| 7 |  | R |  | R |  | R |  | R |
| 8 |  |  |  |  |  |  |  |  |

| 9 | 3 | 11 | 1 |
|---|---|----|---|
| 5 | 16 | 8 | 13 |
| 14 | 7 | 15 | 6 |
| 2 | 12 | 4 | 10 |

FIG. 36

| C1 | C2 | C1 | C2 |
|----|----|----|----|
| C2 | C1 | C2 | C1 |
| C1 | C2 | C1 | C2 |
| C2 | C1 | C2 | C1 |

FIG. 37

| 1 (G) | 11 (R) | 9 (G) | 3 (R) |
|-------|--------|-------|-------|
| 8 (B) | 13 (G) | 16 (B) | 5 (G) |
| 6 (G) | 15 (R) | 14 (G) | 7 (R) |
| 4 (B) | 10 (G) | 12 (B) | 2 (G) |

FIG. 38

| C2 (G) | C1 (R) | C1 (G) | C1 (R) |
|---|---|---|---|
| C1 (B) | C1 (G) | C1 (B) | C1 (G) |
| C1 (G) | C1 (R) | C1 (G) | C1 (R) |
| C1 (B) | C1 (G) | C1 (B) | C2 (G) |

FIG. 39

| C2 (G) | C1 (R) | C1 (G) | C2 (R) |
|---|---|---|---|
| C2 (B) | C1 (G) | C1 (B) | C2 (G) |
| C2 (G) | C1 (R) | C1 (G) | C2 (R) |
| C2 (B) | C1 (G) | C1 (B) | C2 (G) |

IMAGE PROCESSING APPARATUS FOR GENERATING A SINGLE IMAGE OF AN OBJECT USING OVERLAPPING PARTIAL IMAGES

This application is based on patent application Nos. 9-212127, 9-212128, and 9-212129 filed in Japan, the contents of which is hereby incorporated by reference.

BACKGROUND OF THE INVENTION

This invention relates to an image processing apparatus, particularly to synthesis of a plurality of partial images into a single image bearing the entirety of an object image.

There have been known image sensing apparatuses used in a digital video camera and a digital still camera in which a solid state image pickup device including CCD (Charge Coupled Device) is used. For instance, Japanese Unexamined Patent Publication Nos. 5-137059 and 6-141246 disclose a method in which an object image is partially picked up by each of a plurality of image pickup devices, the partially picked up images are processed to produce a synthesized image representative of the overall object image, thereby improving a resolution of the synthesized image.

Japanese Unexamined Patent Publication No. 3-74991 discloses an image reading apparatus including a plurality of image pickup devices to obtain image data of divided areas of an object, respectively. The pickup areas of the plurality of image pickup devices overlap one another at their respective boundary portions. In this apparatus, to produce a synthesized image, detected is a pixel position which provides data having a small spatial density gap with respect to that of adjacent or nearby pixel, and image data picked up by one image pickup device and image data picked up by another image pickup device are joined one another at the detected pixel position to produce a synthesized image.

In the case where an object image is divided into partial images and picked up by a plurality of image pickup devices, and the picked up partial images are joined one another to produce a synthesized object image, a difference among the sensitivity of image pickup devices is liable to generate a gap in image density at a boundary or a joined portion, and to consequently generate a synthesized image having an undesirable gap.

Japanese Unexamined Patent Publication Nos. 5-137059 and 6-141246 disclose the technology that a plurality of image pickup devices pick up an object image portion by portion. However, these publications are silent on the problem of a gap in image density of a synthesized image at a boundary portion due to the sensitivity difference of the image pickup devices.

Japanese Unexamined Patent Publication No. 3-74991 recites a method for improving an image quality deterioration such as image incongruity. However, in this publication, a position of a less density gap is detected line by line in the boundary portion, and partial images are joined one another considering the detected position per line. Consequently, this method requires a complicated process and takes a long processing time.

Further, the partial images are joined in the direction of line, i.e., horizontal direction. Accordingly, this method is not feasible in effectively suppressing a drastic density gap in a boundary portion in the direction of column, i.e., vertical direction. Also, this method is not effective in reducing the image density gap at the boundary portion due to a sensitivity difference of image pickup devices, and accordingly not feasible in producing a synthesized image with enhanced image congruity.

Japanese Unexamined Patent Publication No. 8-289144 discloses a video scanner in which a first correction data for correcting a difference in the performance characteristic of an image pickup device and a second correction data for correcting a difference in a light amount distribution of a focusing lens for focusing a light image on a sensing surface of the image pickup device are stored in advance to perform a shading correction of an image picked up by the image pickup device using the first correction data and the second correction data.

Japanese Unexamined Patent Publication No. 8-294133 discloses a video camera in which a shading correction is performed using position data of a zooming lens and data on an aperture value of a diaphragm.

Japanese Unexamined Patent Publication No. 8-279902 discloses an image pickup device in which stored is a correction data that is set based on a relationship between an incident angle of a light ray incident upon a sensing surface of an image pickup device via a taking lens and an output level of the image pickup device to perform a shading correction of an image picked up by the image pickup device using the correction data.

The above three publications, i.e., Nos. 8-289144, 8-294133, and 8-279902 disclose the various shading corrections to correct a difference in sensitivity of an image pickup device. In the case where one sensing surface is defined by plural image pickup devices, an additional image processing is required in which partial images respectively sensed by the image pickup devices are joined to produce an image representative of the entirety of an object image. Accordingly, to obtain a synthesized image with a less density gap between the partial images, there should be considered a process of linking an image joining and a shading correction.

However, the shading correction disclosed in the above three publications is applicable merely to a case where a sensing surface is defined by one image pickup device. None of these three publications discloses a process of linking an image joining and a shading correction.

SUMMARY OF THE INVENTION

It is an object of the present invention to provide an image processing apparatus which has overcome the problems residing in the prior art.

According to an aspect of the present invention, an image processing apparatus comprises: a partial image data generator which generates a plurality of partial image data pertaining to a plurality of partial images of an object respectively, one partial image being partially overlapped another partial image in a boundary portion; a boundary image data generator which generates boundary image data pertaining to the boundary portion based on image data pertaining to the respective overlapped portions; and an image synthesizer which synthesizes the plurality of partial image data by way of the generated boundary image data to generate image data pertaining to a single image of the object.

According to another aspect of the present invention, an image processing apparatus comprises: a partial image data generator which generates a plurality of partial image data pertaining to a plurality of partial images of an object respectively, one partial image being partially overlapped another partial image in a boundary portion; and an image synthesizer which executes density correction of image data pertaining to the respective overlapped portions, and synthesizes the plurality of corrected partial image data to generate image data pertaining to a single image of the object.

According to still another aspect of the present invention, an image processing apparatus comprises: a plurality of image pickup devices which generate a plurality of partial image data pertaining to a plurality of partial light images of an object respectively, each image pickup device including an arrangement of a number of photoelectric conversion elements respectively attached with three primary color filters in a predetermined positional relationship; an image data interpolator which performs interpolation of partial image data of each primary color generated by each image pickup device; and an image synthesizer which synthesizes the plurality of interpolated partial image data to generate image data pertaining to a single image of the object.

According to yet still another aspect of the present invention, an image processing apparatus comprises: a plurality of image pickup devices which generate a plurality of partial image data pertaining to a plurality of partial light images of an object respectively, each image pickup device including a number of photoelectric conversion elements; a memory which stores correction data for correcting a variation in the photoelectric conversion elements of each image pickup device; an image data corrector which corrects partial image data generated by each image pickup device based on correction data stored in the memory; and an image synthesizer which synthesizes the plurality of corrected partial image data to generate image data pertaining to a single image of the object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing a color filter arranged on a sensing surface of a color image pickup device according to Bayer system;

FIG. 6 is a plan view showing a micro-lens provided on each pixel of the color image pickup device;

FIG. 7 is a cross sectional view of the micro-lens;

FIG. 30 is a diagram showing application of the second boundary image generation to image data obtained by color image pickup device of Bayer system;

FIG. 31 is a diagram showing an arrangement of image data of red color component in the boundary image generated by the second boundary image generation;

FIG. 32 is a diagram showing an arrangement of image data of blue color component in the boundary image generated by the second boundary image generation;

FIG. 33 is a diagram showing an arrangement of image data of green color component in the boundary image generated by the second boundary image generation;

FIG. 35 is a matrix table showing the order of replacement according to which image data pertaining to a left boundary image is replaced by image data pertaining to a right boundary image in the third boundary image generation;

FIG. 36 is a diagram showing an arrangement of image data of a block B8 located at a center of a boundary portion produced according to the matrix table of FIG. 35;

FIG. 37 is a matrix table corresponding to the matrix table of FIG. 35, the matrix table being applicable in the case of single plate color image pickup device of Bayer system;

FIG. 38 is a diagram showing an arrangement of image data of a block B2 of a boundary portion produced according to the matrix table of FIG. 37;

FIG. 39 is a diagram showing an arrangement of image data of a block B8 located at a center of the boundary portion produced according to the matrix table of FIG. 37;

DETAILED DESCRIPTION OF THE PREFERRED EMBODIMENTS OF THE INVENTION

Figure 1:
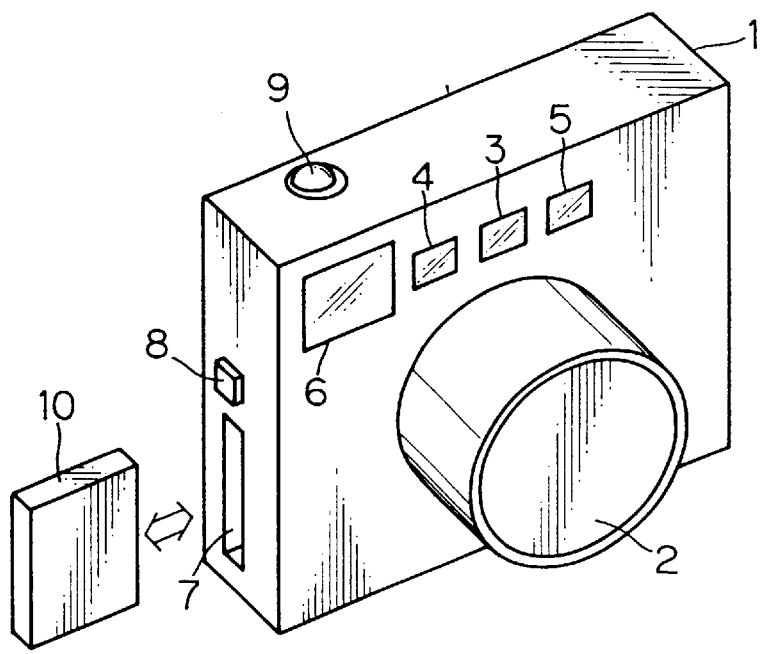
FIG. 1 is a perspective view showing an external appearance of an electronic camera embodying the invention.
Figure 2:
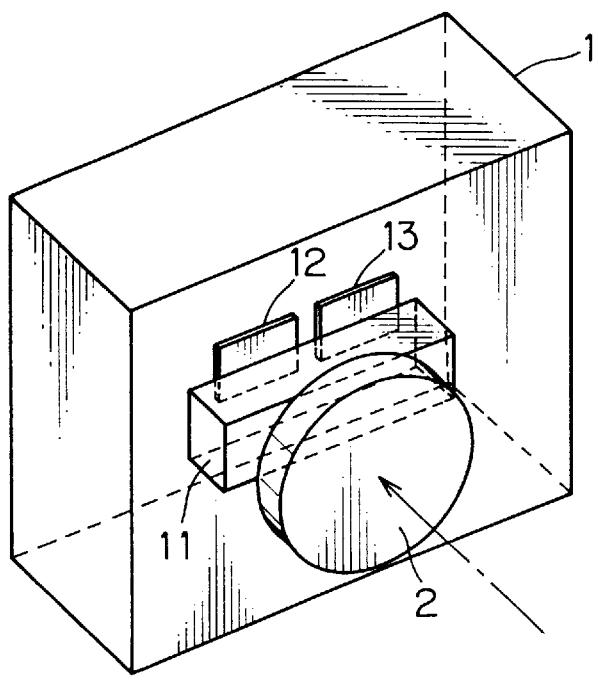
FIG. 2 is a perspective view showing a construction of an optic image pickup system provided in the camera.

FIG. 1 is a perspective view showing an external configuration of an electronic camera embodying the present invention. FIG. 2 is a schematic diagram showing an optic image pickup system provided in the camera.

Referring to FIGS. 1 and 2, the electronic camera 1 comprises a taking lens 2 including a zoom lens provided substantially in a center on a front surface thereof. A light projection window 4 and a light reception window 5 are provided above the taking lens 2 for measurement of an object distance according to an active metering method. A light meter window 3 is provided between the light projection window 4 and the light reception window 5 for measurement of a brightness of the object. An objective window 6 of a viewfinder is provided on a left side of the light projection window 4.

Infrared rays are projected on the object through the light projection window 4, and the infrared rays reflected by the object are received through the light reception window 5. Although the active metering method is adopted in this embodiment, a passive metering method may be adopted.

In one side surface of the camera 1, there are provided a card insertion slot 7 through which a hard disk card 10 (hereafter, referred to as an "HD card") is inserted and ejected, and a card ejection button 8 above the card insertion slot 7 for ejecting the inserted HD card 10. A shutter button 9 is provided at a left end on a top portion of the camera 1.

When photographed images are printed out, the HD card 10 is taken out of the camera 1 by pressing the card ejection button 8, and is then mounted in a printer to print out photographed images stored in the HD card 10.

The camera 1 may be provided with an interface of an SCSI cable. The camera 1 and a printer can directly be connected via the SCSI cable, and image data are transferred from the camera 1 to the printer to print photographed images out.

Although a hard disk card of PCMCIA standards is adopted as a storage medium for image data in this embodiment, a card memory, a mini-disk (MD) or any other storage medium may be used provided that it is capable of storing obtained image data.

Figure 3:
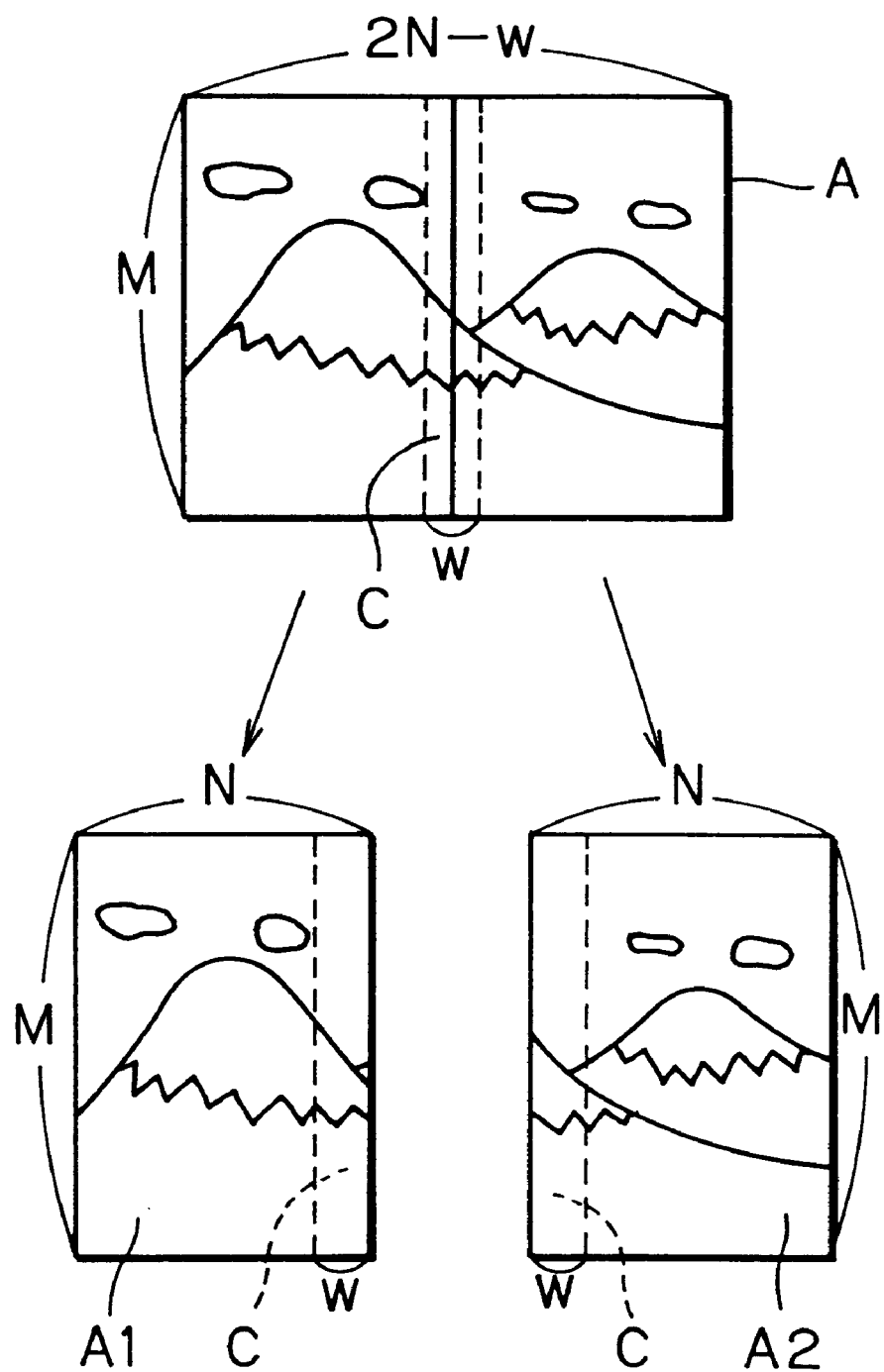
FIG. 3 is a diagram showing a relationship between an overlapped object light image and partial light images picked up by color image pickup devices of the optic image pickup system.

As shown in FIG. 2, at a position behind the taking lens 2, there is provided the optic image pickup system comprising an optic path separator 11 including a prism, and a pair of color image pickup devices 12, 13 including CCD color area sensors, respectively. As shown in FIG. 3, the color image pickup devices 12 and 13 are arranged in a traverse direction of the camera 1. Specifically, an object light image (whole image) A consists of a left half light image (left partial image) A1 and a right half light image (right partial image) A2. A right end of the left partial image A1 and a left end of the right partial image A2 overlap each other at a boundary portion C.

The optic path separator 11 separates an object light image A into the left partial image A1 and the right partial image A2, and the image pickup device 12 picks up the left partial image A1, and the image pickup device 13 picks up the right partial image A2. Thereafter, the left partial image A1 and the right partial image A2 are joined each other by image data processing to produce a synthesized whole image A removing the overlapping boundary portion C.

Figure 4:
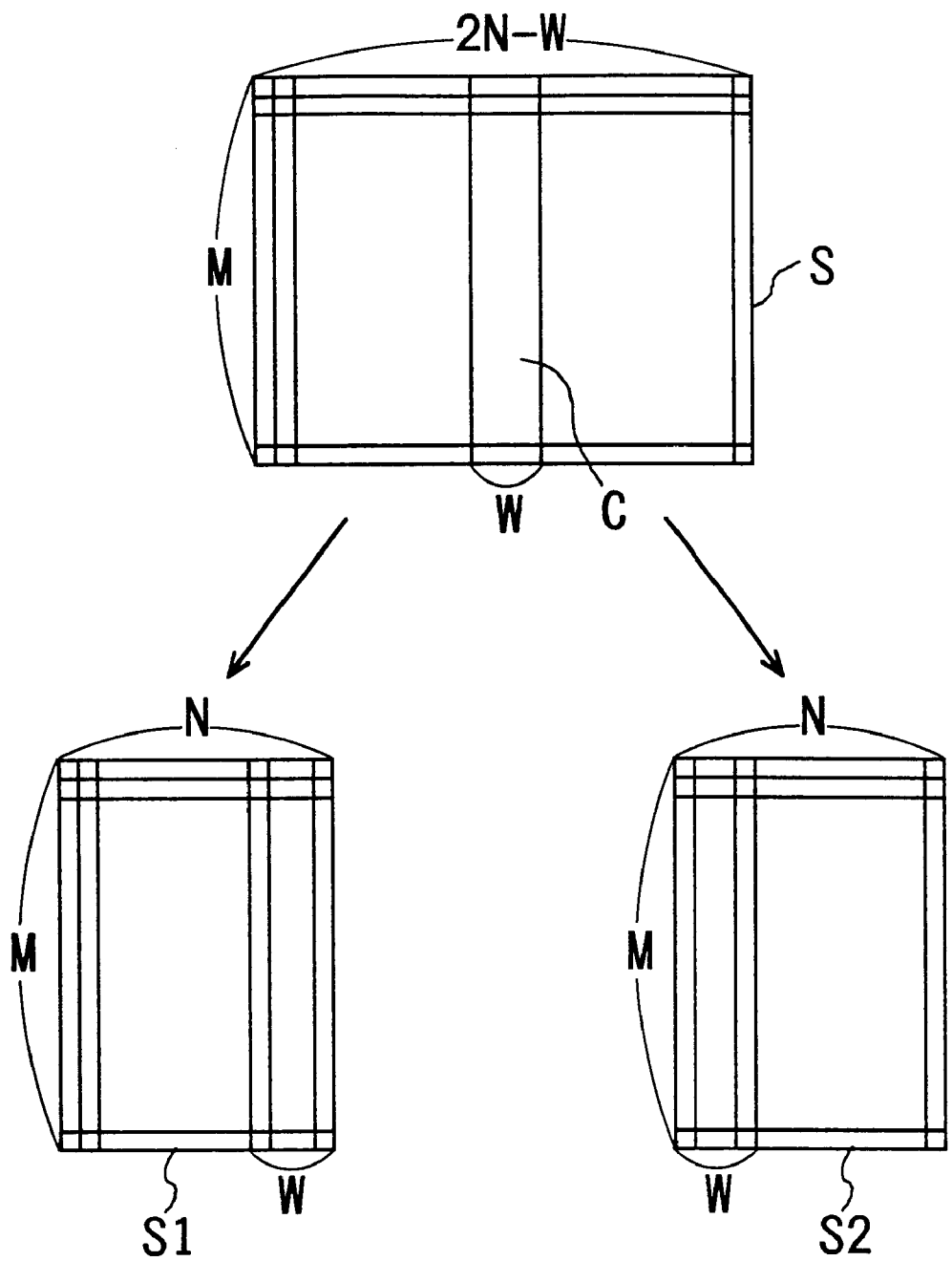
FIG. 4 is a diagram showing a relationship between the number of pixels on the overlapped object light image and the number of pixels on the sensing surfaces of the color image pickup devices.

Referring to FIG. 4, let it be assumed that the number of pixels for covering the whole image A is: M (lines)×2N−W (columns), the number of pixels for covering the boundary portion C is: M (lines)×W (columns), and the number of pixels of each of sensing surfaces S1, S2 of the image pickup devices 12, 13 is: M (lines)×N(columns).

The image pickup device 12(13) includes a single plate color CCD of Bayer system. Color filters of R (Red), G (Green), B (Blue) are provided as an arrangement shown in FIG. 5 on pixels of the sensing surface S1(S2).

The color filters are arranged in a matrix pattern as shown in FIG. 5. The pixel position in the column direction is represented by i (=1,2, . . . M), and the pixel position in the line direction is represented by j (=1,2, . . . N). Green color filters are arranged at intersections of odd lines and even columns ($2\zeta+1$, $2\zeta+2$) and intersections of even lines and odd columns ($2\zeta+2$, $2\zeta+1$). Red filters are arranged at intersections of odd lines and odd columns ($2\zeta+1$, $2\zeta+1$). Blue filters are arranged at intersections of even lines and even columns ($2\zeta+2$, $2\zeta+2$).

As shown in FIGS. 6 and 7, a convex micro-lens 14 is provided on a surface of each color filter. A light ray passing through the micro-lens 14 is condensed on the surface of the pixel, thereby improving the light sensitivity of the pixel.

Figure 8:
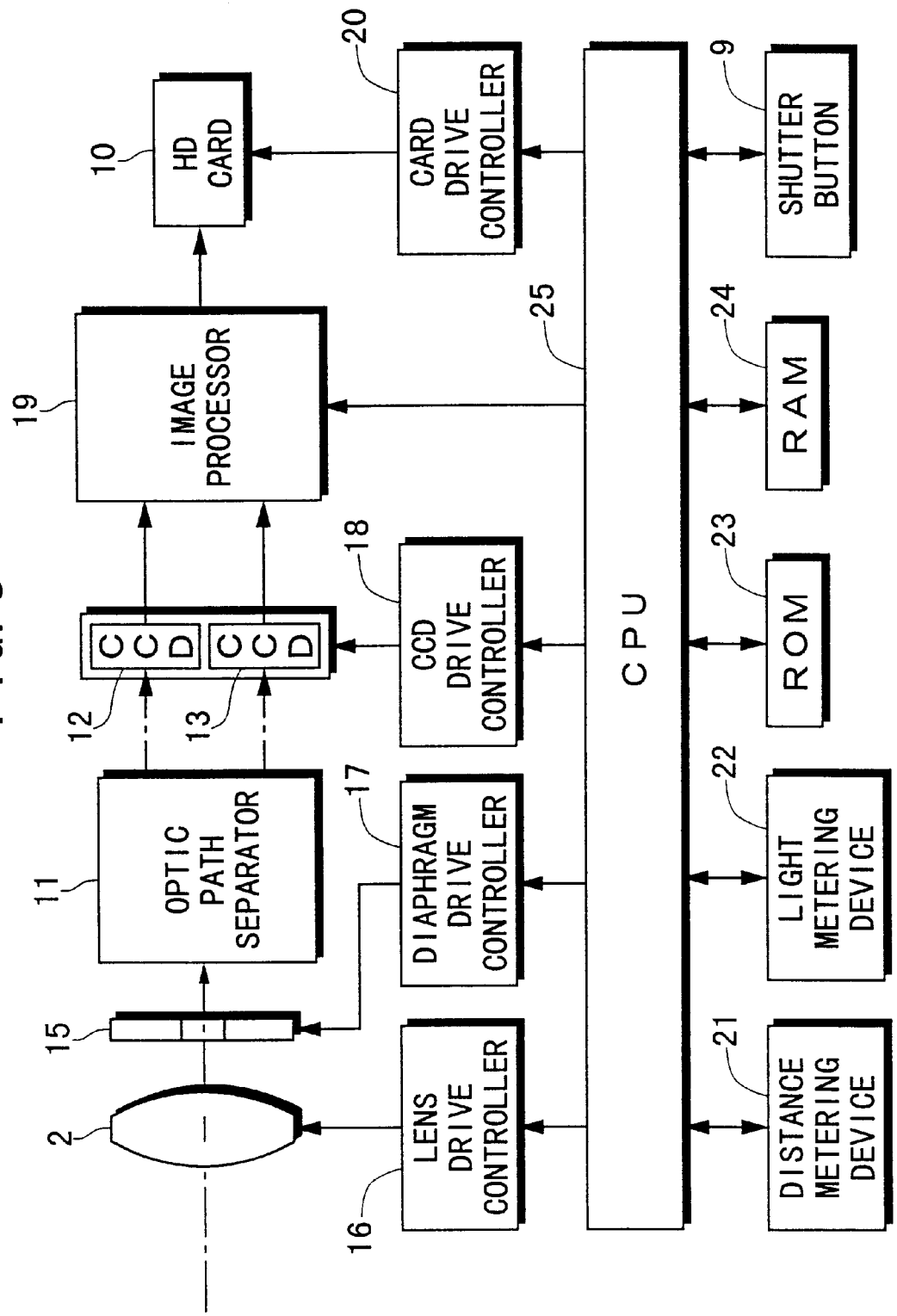
FIG. 8 is a block diagram showing a control construction of the camera.

FIG. 8 is a block diagram showing a configuration of the camera 1.

A diaphragm 15 is provided in the taking lens 2, and serves as a light amount adjuster. A lens drive controller 16 controls the driving of a focusing lens (not shown) of the taking lens 2 for AF control. The focusing lens is provided at a front end of the taking lens 2 and is movable in an optic axial direction by an electric motor (not shown). The lens drive controller 16 controls the electric motor to move the focusing lens of the taking lens 2 based on an AF control value which is outputted from a main controller 25 (hereafter referred to as "CPU") which centrally controls a photographing operation of the camera 1.

A diaphragm drive controller 17 adjusts the aperture of the diaphragm 15. Specifically, the diaphragm drive controller 17 controls the aperture of the diaphragm 15 based on an exposure control value (aperture value) from the CPU 25.

A CCD drive controller 18 controls an image pickup operation (electric charge accumulation and output of the accumulated charges) of the CCD of the image pickup devices 12, 13. The CCD drive controller 18 controls the time for accumulating electric charges (integration time) based on an exposure control value (shutter speed) which is outputted from the CPU 25 to control an exposure light amount. Upon completion of the exposure (accumulation of electric charges) of the image pickup devices 12, 13, the CCD drive controller 18 outputs the accumulated charges of the image pickup device 12 and then the image pickup device 13 successively to an image processor 19.

The image processor 19 applies image processings such as white balance correction, γ correction, and shading correction to the accumulated charges (image data) outputted from the image pickup devices 12, 13, and synthesizes a partial image picked up by the image pickup device 12 (image corresponding to the left partial image A1, hereafter, referred to as "left image G1") and a partial image picked up by the image pickup device 13 (image corresponding to the right partial image A2, hereafter, referred to as "right image G2") to generate a whole image A (hereafter, referred to as "synthesized image G"). The shading correction and generation of the synthesized image G by the image processor 19 are described later in detail.

The HD card 10 is a storage medium for storing image data. Specifically, the HD card 10 stores the synthesized image G which is obtained by synthesizing the left image G1 and the right image G2.

A card drive controller 20 controls the driving of the HD card 10 to record the image data representative of the synthesized image G.

A distance metering device 21 is provided behind the light projection window 4 and the light reception window 5 to measure an object distance. A light metering device 22 includes a light receiving element such as SPC (Silicon Photo Cell) provided behind the light meter window 3 to measure a brightness of the object.

An ROM (Read Only Memory) 23 is a memory for storing data necessary for driving the image pickup system, data necessary for performing shading correction, whole image generation (or synthesizing), and image data interpolation, processing programs and other necessary data. An RAM (Random Access Memory) 24 is a memory for storing data necessary for the CPU 25 to control photographing.

Figure 9:
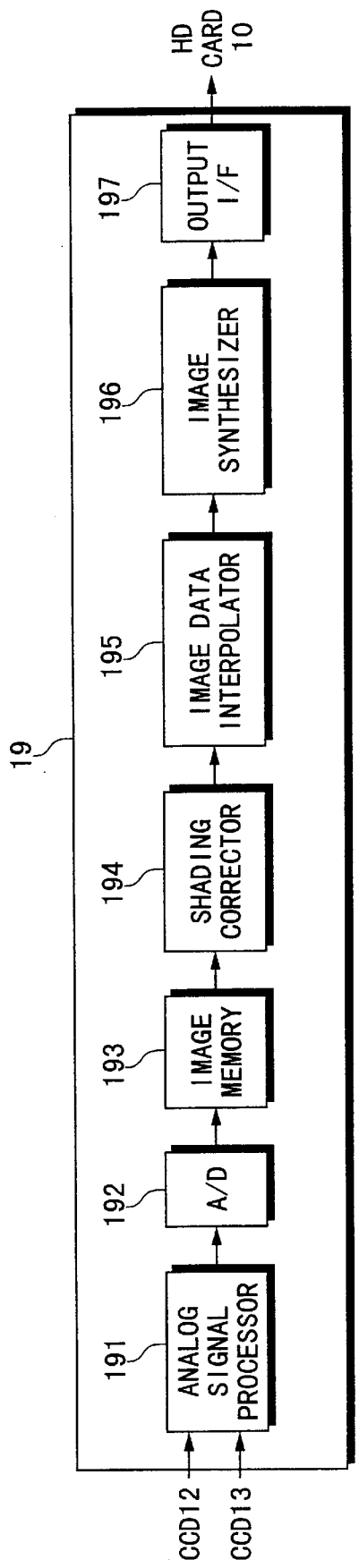
FIG. 9 is a block diagram showing a construction of an image processor provided in the camera, the image processor including a shading corrector, an image synthesizer, and an image data interpolator.

FIG. 9 is a block diagram showing a construction of the image processor 19 which executes shading correction, generation of a synthesized image, and interpolation of image data.

The image processor 19 includes, as a processing element for implementing shading correction, synthesized image generation, and image data interpolation, an analog signal processor 191, an A/D converter 192, an image memory 193, a shading corrector 194, an image data interpolator 195, an image synthesizer 196, and an output interface (or output I/F) 197.

The analog signal processor 191 includes a signal processing circuit such as an unillustrated CDS (Correlative Double Sampling) circuit, and an analog amplifier, and applies processings such as noise reduction and level adjustment (amplification) to image data in the form of an analog signal of each color components of R, G, B which are successively outputted from the image pickup devices 12, 13.

The A/D converter 192 converts the image data outputted from the analog signal processor 191 into image data in the form of a digital signal, e.g., image data of 8-bit. The image memory 193 stores the image data outputted from the A/D converter 192 therein. The image memory 193 has memory areas in which image data of the left image G1 picked up by the image pickup device 12 and image data of the right image G2 picked up by the image pickup device 13 are respectively stored. The image data are stored in the respective memory areas in the unit of color component.

The shading corrector 194 corrects output levels of pixels of the sensing surfaces S1, S2 of the image pickup devices 12, 13 according to a shading correction table which is stored in the ROM 23 in advance.

Specifically, the pupil position of the taking lens 2 and the aperture of the diaphragm 15 are set as parameters in the shading correction table. A predetermined shading correction value corresponding to the detected pupil position of the taking lens 2 and the aperture of the diaphragm 15 is read out from the shading correction table in the ROM 23 and set to the shading corrector 194. The output levels of the left image G1 and the right image G2 stored in the image memory 193 are corrected according to the shading correction table.

The shading correction table is described. A variation in the output level of pixels of an image pickup device cannot be avoided even in the case where a light image having a uniform intensity is projected on a sensing surface of the image pickup device through a taking lens because of the following reasons. In such a case, a shading correction is applied to correct the variation.

There are two causes for the variation in the output levels of pixels, a variation in the sensitivity of pixel and a variation in the light amount incident onto pixel. The sensitivity variation among pixels is caused by a difference in the performance characteristic of micro-lens on each pixel. Also, the sensitivity variation among pixels is caused by a difference in the photoelectric conversion ratio of each pixel.

Figure 11:
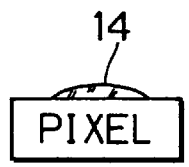
FIG. 11 is a cross sectional view of a micro-lens having a thickness smaller than a standard micro-lens.
Figure 12:
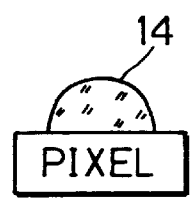
FIG. 12 is a cross sectional view of a micro-lens having a thickness greater than the standard micro-lens.
Figure 13:
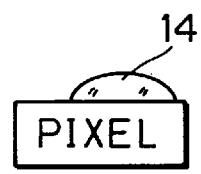
FIG. 13 is a cross sectional view of the micro-lens displaced from a center of the pixel.

More specifically, as shown in FIGS. 11 to 13, the output level of pixel varies due to a difference in the light condensing characteristic in connection with the shape of a micro-lens 14, and due to a difference in the optic characteristic in connection with the composition of the micro-lens 14, such as light reflectance and light transmittance. FIG. 11 shows a micro-lens 14 having a smaller thickness than the standard micro-lens shown in FIG. 7. FIG. 12 shows a micro-lens 14 having a thickness greater than the standard micro-lens. FIG. 13 shows a state where a micro-lens 14 is displaced from a center on the light receiving surface of a pixel.

Figure 14:
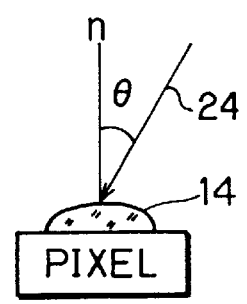
FIG. 14 is a diagram showing that light is incident upon the micro-lens in an oblique direction.

Also, FIG. 14 shows a variation in the light receiving amount of pixels due to a variation in the incident angle θ of a light ray 24 onto the light receiving surface of the pixel with respect to a plane n which is normal to the light receiving surface. Such variation in the incident angle θ occurs due to a change in the pupil position of the taking lens 2 and a change in the aperture of the diaphragm 15.

Referring to FIGS. 15 to 19, more specifically, the relationship between the pupil position of the taking lens 2 and the incident angle of light rays passing the taking lens 2, and the aperture of the diaphragm will be described.

Figure 15:
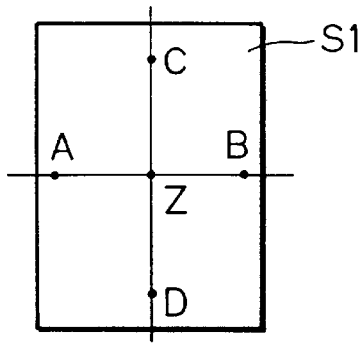
FIG. 15 is a plan view of the sensing surface of the image pickup device.

In FIG. 15, a plane C-Z-D perpendicularly intersects the sensing surface S1 passing the points C, Z, and D, the point Z being a center of the sensing surface S1, the points C and D being respectively upper and lower points. A plane A-Z-B perpendicularly intersects the sensing surface S1 passing the points A, Z, and B, the points A and B being respectively left and right points.

Figure 16:
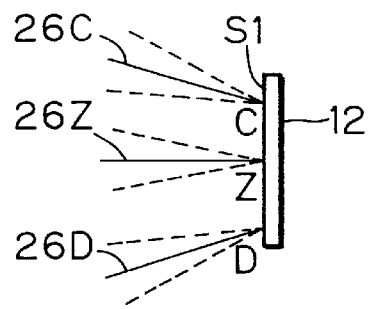
FIG. 16 is a diagram showing an incident angle of a light ray onto the sensing surface in the case where the pupil position of a taking lens goes far from the sensing surface of the image pickup device.

FIG. 16 shows the incident angle of light rays on the plane C-Z-D in the case that the pupil position of the taking lens 2 is far from the sensing surface S1. As shown in FIG. 16, the principal light ray 26C of a light ray bundle incident onto the point C and the principal light ray 26D of a light ray bundle incident onto the point D converge toward the sensing surface S1.

Figure 17:
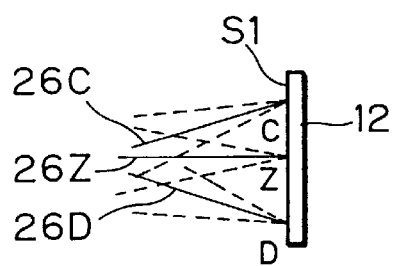
FIG. 17 is a diagram showing an incident angle of a light ray onto the sensing surface in the case where the pupil position of the taking lens approaches near the sensing surface of the image pickup device.

On the other hand, FIG. 17 shows the incident angle of light rays on the plane C-Z-D in the case that the pupil position of the taking lens 2 is near the sensing surface S1. As shown in FIG. 17, the principal light ray 26C of a light ray bundle incident onto the point C and the principal light ray 26D of a light ray bundle incident onto the point D diverges toward the sensing surface SI.

Figure 18:
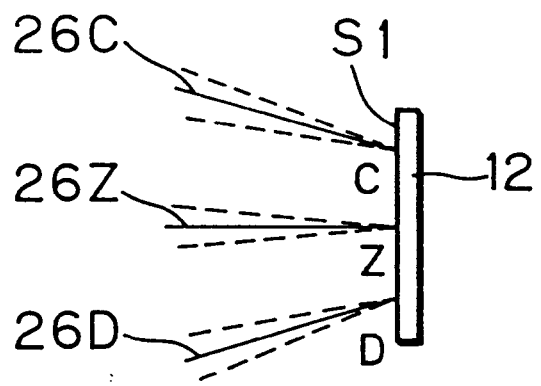
FIG. 18 is a diagram showing a flux of light rays when a diaphragm aperture is decreased in the case of FIG. 16.
Figure 19:
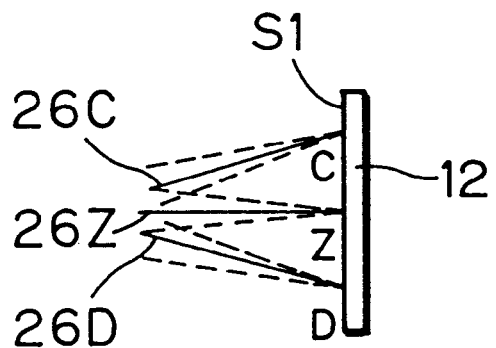
FIG. 19 is a diagram showing a flux of light rays when a diaphragm aperture is increased in the case of FIG. 17.

Further, in the case where the aperture of the diaphragm 15 is reduced at the same pupil position shown in FIGS. 16 and 17, the flux of light rays decreases as shown in FIGS. 18 and 19. The dotted lines in FIGS. 16 to 19 represent outlines of each light ray bundle incident onto the sensing surface S1.

To summarize the above, the principal light ray 26Z of the light ray bundle incident onto the center point Z is incident substantially normal to the sensing surface S1, whereas the principal light rays 26C and 26D of the light ray bundles incident onto the points C and D are incident on the sensing surface S1 at oblique angle to the principal light ray 26Z. Accordingly, even if there should be no difference in the sensitivity of pixels, occurrence of output level gap cannot be avoided between pixels of the points Z and C (or D) on the sensing surface S1. This is the same in the plane A-Z-B.

Figure 20:
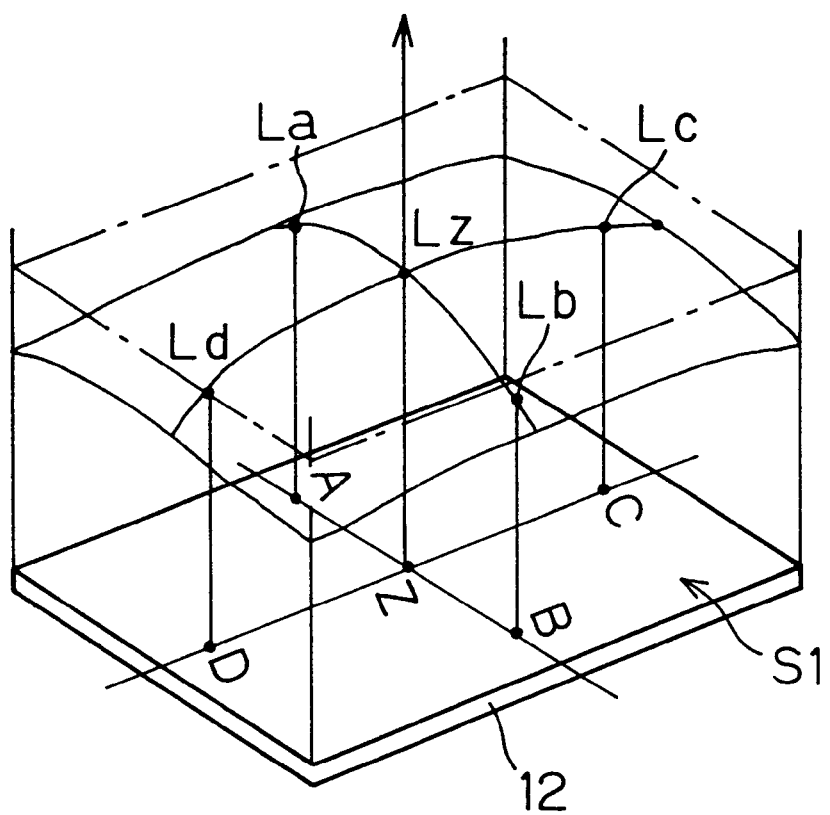
FIG. 20 is a perspective view of a distribution of output level (light receiving amount) over the sensing surface of the image pickup device.

Accordingly, in the case where an object light image having a uniform intensity is picked up, the contour of output level of image data picked up by the image pickup device 12 can be presumed to have a convex shape shown in FIG. 20. In FIG. 20, specifically, the sensing surface S1 is on a bottom plane and the contour of output level of the image pickup device 12 is represented by a top surface. It will be seen that the output level on a periphery of the sensing surface S1 is lower than that on a center of the sensing surface S1.

The shading correction table is adapted for correcting the output level of image data picked up by the image pickup device 12 into a flat contour, as represented by the broken lines in FIG. 20, whose output level is substantially set at the same level as the output level Lz corresponding to the center Z of the sensing surface S1. The shading correction table sets a correction coefficient K (multiplication coefficient) for each pixel of the sensing surface S1. For instance, when the output level of the pixel A is La, the correction coefficient $K_A$ for the pixel A is set at $K_A=Lz/La$.

In the case where the output level at an arbitrary pixel point (i,j) is set at L(i,j), and the correction coefficient for the pixel (i,j) is set at K(i,j), the shading correction table sets coefficient data for pixels (M×N), i.e., $K(i,j)=Lz/L(i,j)$ (i=1, 2, ... M, j=1, 2, ... N). If a variation in the output level of pixels can be considered to occur only due to a variation in the photoelectric conversion characteristic of CCD elements of the image pickup device 12 including the performance characteristic of micro-lens 14, it will be sufficient to provide one shading correction table for the variation in the photoelectric conversion characteristic of CCD elements. However, as described above, the variation in the output level of pixels is caused by change in the pupil position of the taking lens 2 and the aperture of the diaphragm 15, in addition to a variation in the photoelectric conversion characteristic of CCD elements. To execute shading correction considering each pupil position of the taking lens 2 and each aperture of the diaphragm 15, it is necessary to provide a shading correction table for each parameter, i.e., each pupil position of the taking lens 2, each aperture of the diaphragm 15.

However, if providing a shading correction table having correction coefficients for all the pixels for each parameter, it will be necessary to provide a large memory having a huge capacity to store a great amount of data. For this reason, in this embodiment, as will be described below, the amount of data necessary for shading correction is reduced by several manners, specifically, by decreasing the number of coefficients K(i,j) or by reducing the number of shading correction tables for a number of parameters.

It should be noted that the following description is made with respect to the sensing surface S1 of the image pickup device 12, but the same principle can be applied to the sensing surface S2 of the image pickup device 13.

Figure 21:
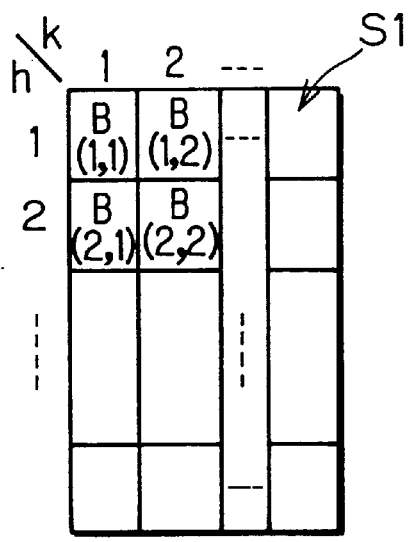
FIG. 21 is a diagram showing division of the sensing surface into a plurality of blocks.

A first reduction manner is described with reference to FIG. 21. In this manner, the sensing surface S1 of the image pickup device 12 is divided into a plurality of blocks B(h,k) (h=1, 2, . . . , k=1, 2, . . . ), each block covering a predetermined number of pixels, e.g., pixels of 16×24, and the coefficient K(h, k) is set block by block. In this way, the memory capacity for shading correction table is reduced.

A second manner is to reduce the number of shading correction tables for changes in the aperture of the diaphragm. Specifically, in the case where the output level of the image pickup device 12 substantially linearly varies with the aperture of the diaphragm 15, there are provided two shading correction tables, that is, one for a maximum aperture of the diaphragm 15, and the other for a minimum aperture of the diaphragm 15. For an intermediate aperture of the diaphragm 15, correction coefficient K(h,k) for each block of the sensing surface S1 is calculated based on the maximum and minimum shading correction tables.

For instance, it is assumed that correction coefficients $K(h,k)_{F=2}$, $K(h,k)_{F=32}$ are set for aperture values F=2, F=32, respectively, correction coefficient $K(h,k)_{F=x}$ for aperture value F=x (2<x<32) is calculated in accordance with Equation (1)

$$K(h,k)_{F=x}=\{(X-2)\cdot K(h,k)_{F=32}+(32-x)\cdot K(h,k)_{F=2}\}/(32-2) \qquad (1)$$

It should be appreciated that even if the output level of the image pickup device 12 nonlinearly varies with the aperture of the diaphragm 15, correction coefficient $K(h,k)_{F=x}$ for aperture value F=x (2<x<32) can be calculated in accordance with function $K(h,k)_{F=x}=f(K(h,k)_{F=2}, K(h,k)_{F=32})$ as long as this function is known.

A third manner is to reduce the number of shading correction tables for changes in the pupil position of the taking lens 2. Specifically, the incident angle θ of the incident light ray varies in accordance with a change in the pupil position of the taking lens 2 in a periphery portion of the sensing surface S1 of the image pickup device 12. Consequently, the output level also varies in the periphery portion in accordance with the change in the pupil position. In this case, we can utilize the feature that the incident angle θ varies with the pupil position in a fixed relationship. For example, a reference shading correction table for the pupil position (hereinafter, referred to as "max pupil position") to cause a maximum incident angle $\theta_{max}$ is prepared, and shading correction tables for other pupil positions are calculated based on the reference shading correction table for the max pupil position. At pupil positions (hereinafter, referred to as "non-max pupil positions") other than the max pupil position, the incident angle θ is smaller than the maximum incident angle $\theta_{max}$. Accordingly, correction coefficients K(h,k)' for a non-max pupil position are calculated based on correction coefficients K(h,k) for the max pupil position in the following manner.

Figure 22:
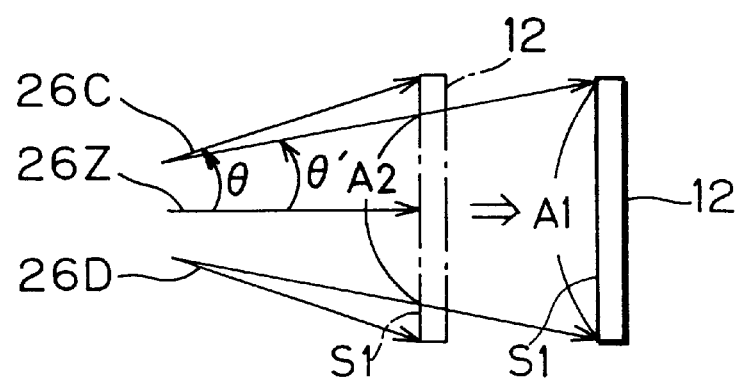
FIG. 22 is a diagram showing how the incident angle of a light ray onto the sensing surface varies in accordance with shifting of the pupil position of the taking lens.

The relationship between an incident angle θ smaller than the maximum incident angle $\theta_{max}$ and the sensing surface S1 of the image pickup device 12 can be equivalently translated into, as shown in FIG. 22, a manner that the sensing surface S1 is moved away from the taking lens 2 while the taking lens 2 is fixed at the max pupil position.

It should be noted that blocks defined on the reference correction table for the max pupil position corresponds to those defined on the image sensing surface S1 one to one. However, in the case of non-max pupil position, a portion of blocks of the reference correction table are used to make a shading correction table for a non-max pupil position. In FIG. 22, indicated at A1 is an area of all the blocks of the reference correction table for the max pupil position. Indicated at A2 is an area of blocks of the reference correction table for a non-max pupil position. The incident angle θ' with respect to the area A2 is smaller than the incident angle θ with respect to the area A1.

Figure 23:
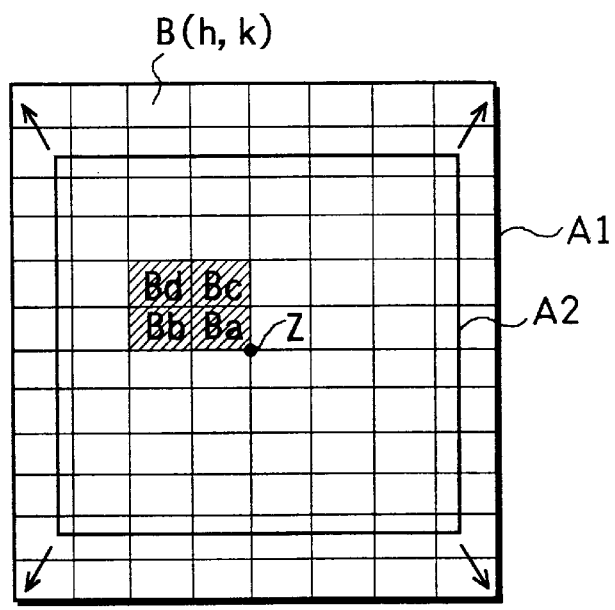
FIG. 23 is a diagram showing an area of the sensing surface to which a correction coefficient K(h,k) of a shading correction table is applied when the pupil position of the taking lens is shifted to such a position that the incident angle decreases from a maximum value.

As shown in FIG. 23, correction coefficients K(h,k)' for a non-max pupil position are calculated by changing or enlarging correction coefficients K(h,k) for the area A2 corresponding to the incident angle θ' to the size of the area A1. The following is a description as to how this calculation is conducted.

The point Z in FIG. 23 is a center of the reference correction table or the area A1. Each block B(h,k) is allotted with a correction coefficient K(h,k) according to the reference shading correction table. Correction coefficients K(h,k) within the area A2 are used to calculate correction coefficients K(h,k)' for a non-max pupil position to make the incident angle θ smaller than the maximum value $\theta_{max}$.

Figure 24:
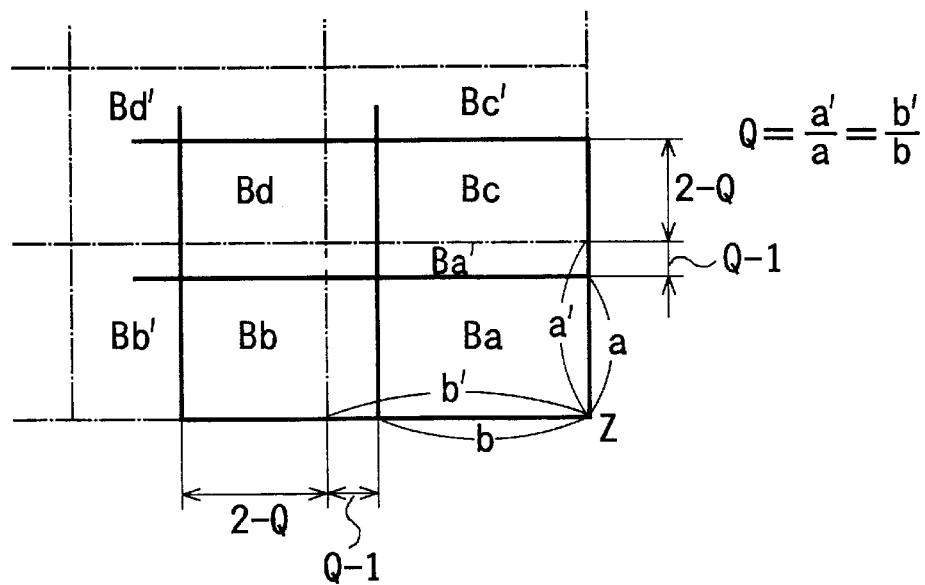
FIG. 24 is a diagram describing a manner of changing the correction coefficient K(h,k) when the pupil position of the taking lens is shifted to such a position that the incident angle decreases from a maximum value.

FIG. 24 is a diagram showing an area change of a block B(h,k) in enlargement of the area A2 to the area A1. In FIG. 24, four blocks Ba to Bd (hatched blocks in FIG. 23) are shown. The four blocks Ba to Bd are located in an upper left portion (or the second quadrant) of four areas which are defined on the reference correction table with horizontal and vertical axes which pass the center Z in FIG. 23. The blocks Ba to Bd shown by the solid lines in FIG. 24 are blocks defined on the reference correction table, that is, the sensing surface S1. The blocks Ba' to Bd' shown by the broken lines in FIG. 24 are enlarged blocks.

It is assumed that reference correction coefficients for the blocks Ba to Bd are respectively Ka to Kd, and correction coefficients for enlarged blocks are Ka' to Kd'. A block defined on a shading correction table for the non-max pupil position, which has the same size as the block Ba of the reference correction table, can be given with the correction coefficient Ka' because the block Ba lies within the enlarged block Ba', as shown in FIG. 24. The correction coefficient Ka' can be given with Ka for the block Ba of the reference correction table, i.e., Ka'=Ka.

As for blocks defined on the shading correction table for the non-max pupil position and corresponding to the other blocks Bb to Bd of the reference correction table, these blocks are covered by two or more enlarged blocks Ba' to Bd'. For example, a block of the shading correction table for the non-max pupil position corresponding to the block Bb is covered by a part of the enlarged block Ba' and a part of the enlarged block Bb'. A block of the shading correction table for the non-max pupil position corresponding to the block Bc is covered by a part of the enlarged block Ba' and a part of the enlarged block Bc'. A block of the shading correction table for the non-max pupil position corresponding to the block Bd is covered by a part of the enlarged block Ba', a part of the enlarged block Bb', a part of the enlarged block Bc', and a part of the enlarged block Bd'.

Accordingly, correction coefficients K (h,k)' for the non-max pupil position are obtained by setting a ratio between areas of enlarged blocks covering a specified block as weighting coefficient, and calculating a weighted average of correction coefficients K(h,k) of the covering enlarged blocks using the weighting coefficient.

For instance, the block corresponding to the block Bd is covered by the enlarged blocks Ba' to Bd'. When the enlargement ratio is Q>1, the area ratio between the enlarged blocks Ba' to Bd' in this block is:

$$Ba':Bb':Bc':Bd'=(Q-1)^2:(2-Q)(Q-1):(Q-1)(2-Q):(2-Q)^2$$

Accordingly, a correction coefficient Kd' with respect to the block of the shading correction table for the non-max pupil position, corresponding to the block Bd of the reference correction table, is calculated in accordance with Equation (2).

$$Kd'=(Q-1)^2 \cdot Ka+(Q-1)\cdot(2-Q)\cdot(Kb+Kc)+(2-Q)^2 \cdot Kd \qquad (2)$$

Similarly, respective correction coefficient Kb', Kc' for blocks corresponding to the blocks Bb, Bc are calculated in accordance with Equations (3) and (4).

$$Kb'=(Q-1)\cdot Ka+(2-Q)\cdot Kb \qquad (3)$$

$$Kc'=(Q-1)\cdot Ka+(2-Q)\cdot Kc \qquad (4)$$

Further, correction coefficients for blocks B(h,k) corresponding to a periphery of the sensing surface S1 can be calculated similar to the above-described way.

The shading correction table has been described taking the example of the image pickup device 12 as described above. The same procedure is adopted to the image pickup device 13.

Four shading correction tables for the following cases (A) to (D) (hereafter, referred to as "reference correction tables") are prepared for each of the image pickup devices 12, 13. In the case where a detected pupil position and/or a detected aperture of the diaphragm 15 are different from parameters of the cases (A) to (D), a shading correction table suitable for a detected value or parameter is obtained by the above-described calculations.

(A) The aperture of the diaphragm 15 is maximum and the pupil position of the taking lens 2 is such that light is incident onto the sensing surface at a maximum converging angle (the case shown in FIG. 16);

(B) The aperture of the diaphragm 15 is maximum and the pupil position of the taking lens 2 is such that light is incident onto the sensing surface at a maximum diverging angle (the case shown in FIG. 17);

(C) The aperture of the diaphragm 15 is minimum and the pupil position of the taking lens 2 is such that light is incident onto the sensing surface at a maximum converging angle (the case shown in FIG. 18); and (D) The aperture of the diaphragm 15 is minimum and the pupil position of the taking lens 2 is such that light is incident onto the sensing surface at a maximum diverging angle (the case shown in FIG. 19).

These reference correction tables are further multiplied by a correction table for correcting a variation in the photoelectric conversion characteristic of the image pickup device 12 (13) including micro-lens characteristic, and a final shading correction table is consequently calculated. The reference correction tables and the correction table for photoelectric conversion characteristic are stored in the ROM 23.

Referring back to FIG. 9, the image data interpolator 195 calculates data for pixel positions having no actual data for each of the color components, R, G, B. The image pickup device 12 (13) includes the single plate color CCD of Bayer system. Accordingly, there are data-vacant pixel positions in each color component data, as shown in FIG. 5. Also, there is a difference in the pixel density between the color components, R, G, B. The image data interpolator 195 is adapted for making the pixel densities of the color components R, G, B uniform.

More specifically, for image data of the color component R, the image data interpolator 195 interpolates image data for the pixel positions at intersections of even columns and odd lines, and at intersections of even columns and even lines. For image data of the color component B, the interpolator 195 interpolates image data for the pixel positions at intersections of odd columns and odd lines, and at intersections of even columns and odd lines. For image data of the color component G, the interpolator 195 interpolates image data for the pixel positions at intersections of even columns and even lines, and at intersections of odd columns and odd lines.

Figure 25:
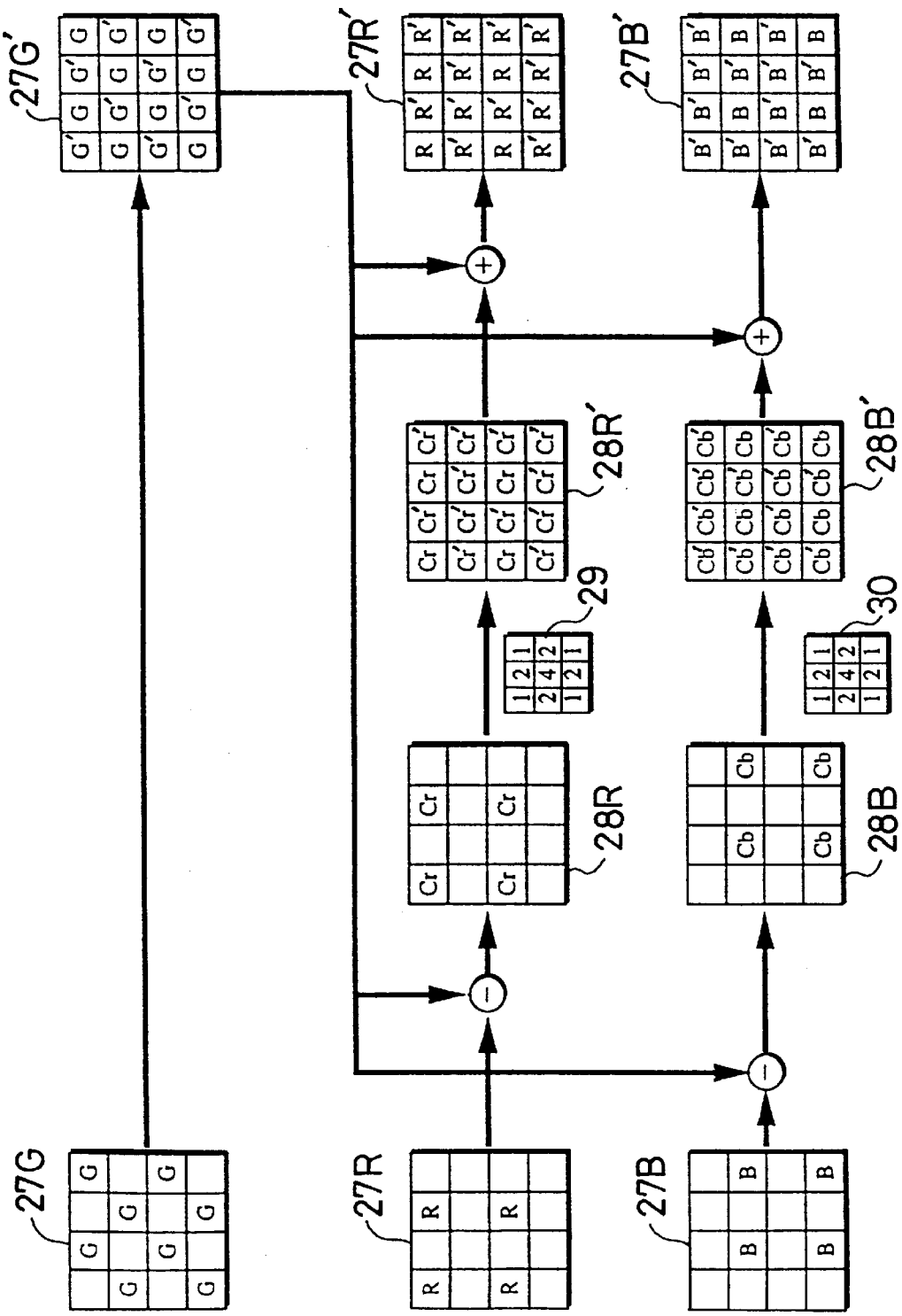
FIG. 25 is a diagram showing an interpolation of image data of each of red, green, and blue color components.

The above interpolation is implemented according to a procedure shown in FIG. 25. In FIG. 25, color image data 27R (27G or 27B) has cells (pixels) given with the letter R (G or B) and cells (pixels) not given with the letter R (G or B). The cell given with the letter R (G or B) represents the pixel having actual red (green or blue) image data while the cell not given with the letter R (G or B) represents the pixel having no actual red (green or blue) image data. In other words, the blank cell denotes the pixel position where image data interpolation should be implemented.

Image data 27R', 27G', 27B' represent image data after the interpolation. The cells given with the letters R', G' or B' mean that the cells are interpolated with red, green, blue image data.

Converting the image data 27R using the interpolated image data 27G' produces color difference data 28R. Interpolating the color difference data 28R using a predetermined interpolation filter 29 produces color difference data 28R'. Similarly, converting the image data 27B using the interpolated image data 27G' produces color difference data 28B. Interpolating the color difference data 28B using a predetermined interpolation filter 30 produces color difference data 28B'. Cells given with the letters Cr or Cb indicate that the corresponding pixel positions have color difference data of R or B. Cells given with the letters Cr' or Cb' indicate that the corresponding pixel positions have interpolated color difference data of R or B.

As for the image data 27G, image data at the pixel positions $(2\zeta+1, 2\zeta+1)$, $(2\zeta+2, 2\zeta+2)$ are interpolated by calculating the average value of two image data except the maximal value and the minimal value among four image data corresponding to pixel positions adjacent to each other. For instance, image data G(2,2) at the pixel position (2,2) is interpolated as (G(3,2)+G(2,1))/2 where G(1,2), G(2,3) are respectively the maximal and minimal values among four image data G(1,2), G(2,3), G(3,2), G(2,1).

As for image data at the pixel position, e.g., (1,1) located in a periphery of the sensing surface S1(S2) where there exist only two image data as adjacent data, the image data at the peripheral pixel position is interpolated by calculating the average value of these two adjacent image data. Further, as for image data at, e.g., the pixel position (3,1) where there exist three image data as adjacent image data, the image data is interpolated by calculating the average value of two image data except the maximal or minimal value.

As for the image data 27R (27B), color data of R (B) is converted into color difference data Cr (Cb) or the color difference data 28R (28B) by using the interpolated image data 27G'. The color difference data 28R (28B) are interpolated by using the predetermined interpolation filter 29 (30) to generate the color difference data 28R' (28B'). Thereafter, the interpolated color difference data 28R' (28B') is re-converted using the interpolated image data 27G' to generate interpolated image data 27R' (27B').

For example, the image data 27R at the pixel position (2,2) is interpolated as follows. First, image data of R(1,1), R(1,3), R(3,1), R(3,3) at the respective pixel positions (1,1), (1,3), (3,1), (3,3) are converted into color difference data Cr(1,1), Cr(1,3), Cr(3,1), Cr(3,3) by reducing image data G(1,1)', G(1,3)', G(3,1)', G(3,3)' which represent color data of G at the respective pixel positions after interpolation.

Subsequently, the color difference data Cr(1,1), Cr(1,3), Cr(3,1), Cr(3,3) are subjected to filtering by the interpolation filter 29 to generate color difference data Cr(2,2) at the pixel position (2,2). The interpolation filter 29 in this embodiment has a filtering coefficient "1" with respect to the color difference data Cr(1,1), Cr(1,3), Cr(3,1), Cr(3,3). Accordingly, the color difference data Cr(2,2) is:

$$Cr(2,2)=Cr(1,1)+Cr(1,3)+Cr(3,1)+Cr(3,3).$$

Subsequently, image data G(2,2)' which represents color image data G at the pixel position (2,2) after interpolation, is added to the color difference data Cr(2,2) to generate image data R(2,2)' which represents color data R at the pixel position (2,2).

The interpolated image data 27R', 27G', 27B' respectively representing color data of R, G, B which have been subjected to interpolation by the image data interpolator 195 are outputted to the image synthesizer 196 and stored in an unillustrated memory.

Figure 10:
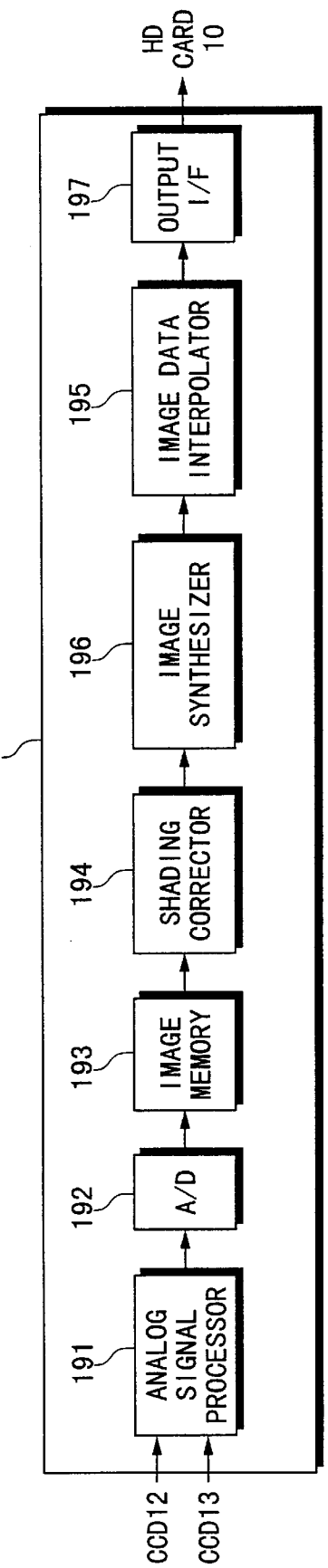
FIG. 10 is a block diagram showing a construction of a modified image processor.

In this embodiment, the image synthesizer 196 is provided after the image data interpolator 195. Accordingly, in this arrangement, after interpolating the image data of each color components R, G, B, the left image G1 and the right image G2 are joined (synthesized). As an altered arrangement, as shown in FIG. 10, the image data interpolator 195 may be provided after the image synthesizer 196, and the data interpolation may be implemented after synthesizing the left image G1 and the right image G2.

Interpolating image data before synthesizing is advantageous in preventing generation of a synthesized boundary image with color irregularities. Specifically, let it be assumed that the boundary portion C has a uniform brightness and a single color, and the respective sensitivities of the image pickup devices 12 and 13 are different, e.g., the sensitivity of the image pickup device 12 to that of the image pickup device 13 is 100:93. In such a case, if the respective color output levels $Lr_1$, $Lg_1$, $Lb_1$, of the image pickup device 12 with respect to the boundary portion C are: $Lr_1=Lg_1=Lb_1=255$, the respective color output levels $Lr_2$, $Lg_2$, $Lb_2$ of the image pickup device 13 with respect to the boundary portion C will be:

$$Lr_2=Lg_2=Lb_2=237(\approx 255\times 0.93).$$

If image data of the two image pickup devices 12 and 13 are mingled at random without image data interpolation, color irregularities appear in a synthesized image. For example, if green image data having the output level of 255 is mixed with red or blue image data having the output level of 237, a color irregularity appears in a boundary image Gc, which is a synthesized image at the boundary portion C. Accordingly, it will be understandable that in the former arrangement where the image synthesizer 196 follows the image data interpolator 195, no color irregularities appear in a boundary portion even if image data are mingled at random.

On the other hand, the latter arrangement where the image data interpolator 195 follows the image synthesizer 196 is advantageous in shortening the time for generating a synthesized image G.

Referring back to FIG. 9, the image synthesizer 196 generates the synthesized image G which is obtained by joining the left image G1 sensed by the image pickup device 12 and the right image G2 sensed by the image pickup device 13 at the boundary portion C. The output I/F 197 is an interface via which image data pertaining to the synthesized image G is transferred to the HD card 10.

The image synthesizer 196 generates a boundary image at the boundary portion C (hereafter, referred to as "boundary image Gc") which is a synthesized image of a left boundary image at the boundary portion C in the left image G1 (hereafter, referred to as "left boundary image Gc1") and a right boundary image at the boundary portion C in the right image G2(hereafter, referred to as "right boundary image Gc2").

The image synthesizer 196 generates the boundary image Gc in such a manner that a density difference or gap between the left boundary image Gc1 and the right boundary image Gc2 becomes insignificant and the color density smoothly changes over the left boundary image Gc1 and the right boundary image Gc2. The image synthesizer 196 performs the image synthesizing for each of the color components R, G, B, and outputs image data of the synthesized image G to the HD card via the output I/F 197.

In this embodiment, the following synthesizing manners may be performed to synthesize a left boundary image Gc1 and a right boundary image Gc2 to generate a boundary image Gc.

First Synthesizing Manner

Figure 26A:
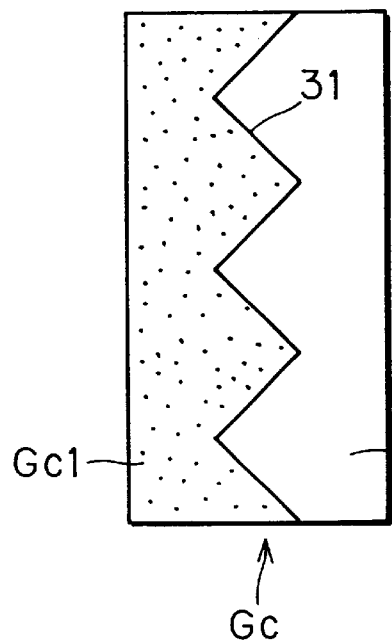
FIGS. 26A and 26B are diagrams showing a first boundary image generation, FIG. 26A showing that a boundary between partial images is in the form of a sawtooth wave, FIG. 26B showing that the boundary between partial images is in the form of a sinusoidal wave.
Figure 26B:
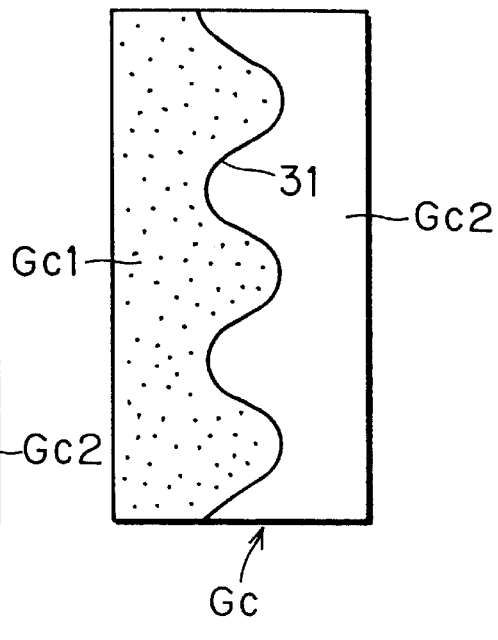

FIGS. 26A and 26B are diagrams showing a first synthesizing manner to generate a boundary image Gc. In this manner, a left boundary image Gc1 and a right boundary image Gc2 are simply joined one another in such a way as to form a boundary 31 in a zigzag shape in a column direction, as shown in FIGS. 26A and 26B. A line or a curve 31 represent joining borders of the left boundary image Gc1 and the right boundary image Gc2.

FIG. 26A shows the boundary 31 having a sawtooth shape, and FIG. 26B shows the boundary 31 having a sinusoidal shape. Because the more the zigzag is, the less the density gap appears for the viewer, it is preferable to make the boundary shape change more variably. The boundary shape may be possible other than those shown in FIGS. 26A and 26B as long as the boundary shape is not uniform.

The image synthesizer 196 controls reading-out of image data pertaining to the left boundary image Gc1 and the right boundary image Gc2 line by line so that the boundary 31 has the zigzag shape. The readout data are synthesized or joined to produce the boundary image Gc.

Figure 27:
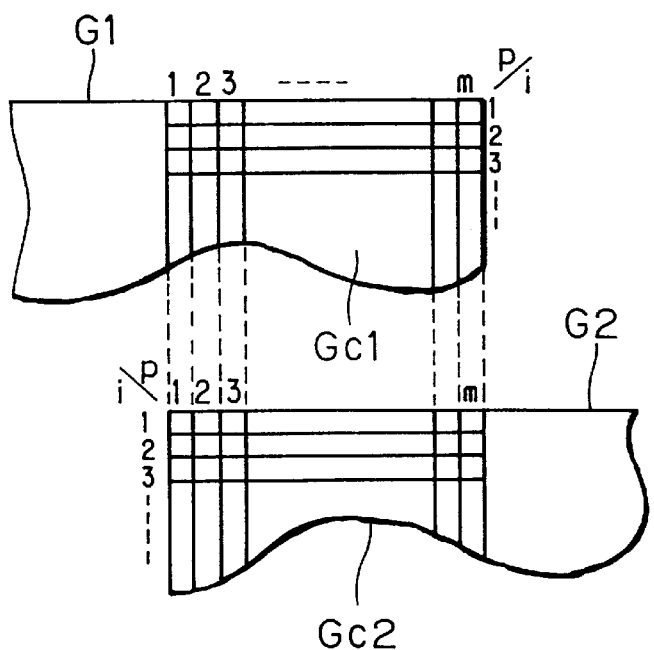
FIG. 27 is a diagram showing address in a line direction of image data pertaining to boundary images.

Now, referring to FIG. 27, let it be assumed that the number of pixels in the boundary image Gc in the line direction is m, the address p at the pixel position in the left boundary image Gc1 and the right boundary image Gc2 in the line direction is set: p=1, 2, . . . m from the left end to the right end. When the joining position of image data at i-th line, i.e., the address at the pixel position in the left boundary image Gc1 or the right boundary image Gc2 adjoining the boundary 31, is r(i), image data Dc(i,p) at the pixel position (i,p) pertaining to the boundary image Gc is:

$$1 \leq p \leq r(i) \quad Dc(i,p)=Dc1(i,p)$$

$$r(i)<p\leq m \quad Dc(i,p)=Dc2(i,p)$$

where Dc1(i,p) is pixel image data at the pixel position (i,p) pertaining to the left boundary image Gc1, and Dc2(i,p) is pixel image data at the pixel position (i,p) pertaining to the right boundary image Gc2.

Second Synthesizing Manner

Figure 28:
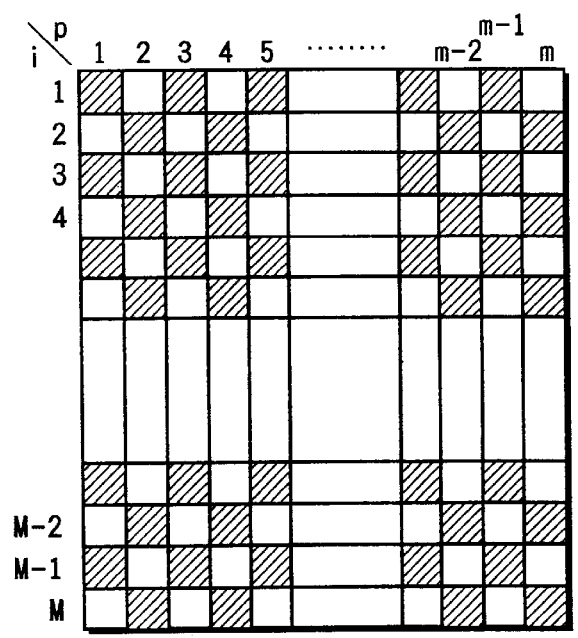
FIG. 28 is a diagram showing a second boundary image generation.

FIG. 28 shows a second synthesizing manner to produce a boundary image Gc. In this manner, pixel image data Dc1 pertaining to a left boundary image Gc1 and pixel image data Dc2 pertaining to a right boundary image Gc2 are joined pixel by pixel or block by block in the form of a matrix. Specifically, FIG. 28 shows that image data pertaining to the boundary image Gc is arranged at pixel positions in a matrix. In FIG. 28, the hatched cells have the pixel image data Dc1 pertaining to the left boundary image Gc1, whereas the blank cells have the pixel image data Dc2 pertaining to the right boundary image Gc2.

Accordingly, the image data Dc(i,p) pertaining to the boundary image Gc is represented by the following Equations (a1) to (d1):

$$Dc(i,p)=Dc1(i,p) \qquad \text{Equation (a1)}$$

where i=2 $\zeta$+1($\zeta$=0,1,2, . . . ), p=2 $\zeta$+1( $\zeta$=0,1,2, . . . ), namely, i (odd number), p (odd number), $$DC(i,p)=Dc2(i,p) \qquad \text{Equation (b1)}$$

where i=2 $\zeta$+1($\zeta$=0,1,2, . . . ), p=2 $\zeta$+2($\zeta$=0,1,2, . . . ), namely, i (odd number), p (even number), $$DC(i,p)=Dc2(i,p) \qquad \text{Equation (c1)}$$

where i=2 $\zeta$+2($\zeta$=0,1,2, . . . ), p=2 $\zeta$+1($\zeta$=0,1,2, . . . ), namely, i (even number), p (odd number), $$DC(i,p)=Dc1(i,p) \qquad \text{Equation (d1)}$$

where i=2 $\zeta$+2($\zeta$=0,1,2, . . . ), p=2 $\zeta$+2($\zeta$=0,1,2, . . . ), namely, i (even number), p (even number).

Figure 29:
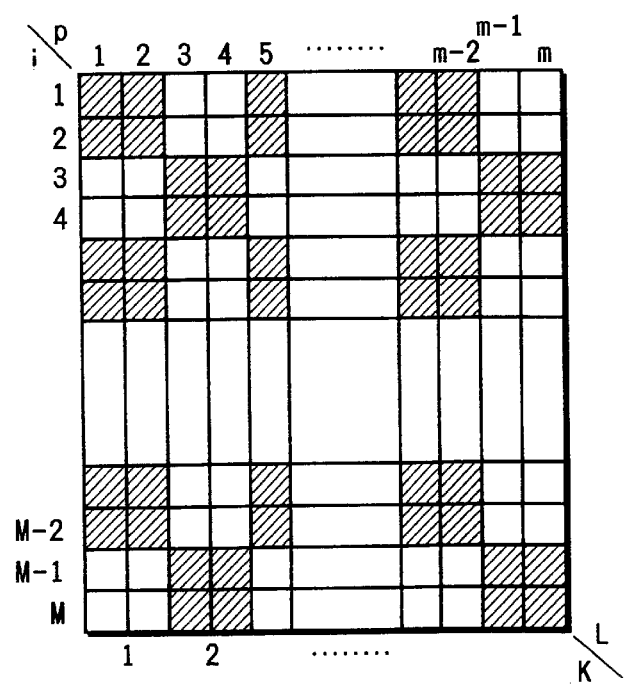
FIG. 29 is a diagram showing a modification of the second boundary image generation.

FIG. 29 is a modification of the second synthesizing manner. In FIG. 29, image data pertaining to a left boundary image Gc1and image data pertaining to a right boundary image Gc2 are joined block by block. Specifically, four pixel data (2×2) compose one block in FIG. 29. To make it general, in the case where one block of image data Dc(i,p) pertaining to a boundary image Gc consists of K×L (K=L= 2,3,4, . . . ) pixels, and the block number in the line direction is s, and the block number in the column direction is t, image data Dc(i,p) is represented by the following Equations (a2) to (d2):

$$Dc(i,p)=Dc1(i,p) \quad \text{Equation (a2)}$$

where the pixel position of Dc(i,p) satisfies the following Equation, $K \cdot s \leq i < K \cdot (s+1)$ and $L \cdot t \leq p < L \cdot (t+1)$, and s is an odd number, and t is an odd number, $$Dc(i,p)=Dc2(i,p) \quad \text{Equation (b2)}$$

where the pixel position of Dc(i,p) satisfies the following Equation, $K \cdot s \leq i < K \cdot (s+1)$ and $L \cdot t \leq p < L \cdot (t+1)$, and s is an odd number, and t is an even number, $$Dc(i,p)=Dc2(i,p) \quad \text{Equation (c2)}$$

where the pixel position of Dc(i,p) satisfies the following Equation, $K \cdot s \leq i < K \cdot (s+1)$ and $L \cdot t \leq p < L \cdot (t+1)$, and s is an even number, and t is an odd number, $$Dc(i,p)=Dc1(i,p) \quad \text{Equation (d2)}$$

where the pixel position of Dc(i,p) satisfies the following Equation, $K \cdot s \leq i < K \cdot (s+1)$ and $L \cdot t \leq p < L \cdot (t+1)$, and s is an even number, and t is an even number.

It should be noted that throughout the Equations (a2) to (d2), i=1,2, ... M, and p=1,2, ... m.

In the case where the second synthesizing manner is applied to a single plate color image pickup device of Bayer system, it may be preferable to synthesize pixel image data Dc1 and pixel image data Dc2 according to the manner shown in FIG. 30, considering pixel positions of color components R, G, B of the image pickup devices 12, 13. FIG. 30 is a diagram showing a synthesized image which is produced by alternately arranging pixel image data Dc1 and pixel image data Dc2. In FIG. 30, the hatched cells have image data Dc1, whereas the blank cells have image data Dc2.

The red pixel image data are arranged in the intersection pixels of odd lines and even columns (see FIG. 31). The blue pixel data are arranged in the intersection pixels of even lines and odd columns (see FIG. 32). In the respective arrangements of red and blue pixel image data, as shown in FIGS. 31 and 32, the pixel image data Dc1 and the pixel image data Dc2 are alternately arranged along the column direction.

Figures 32, 33:
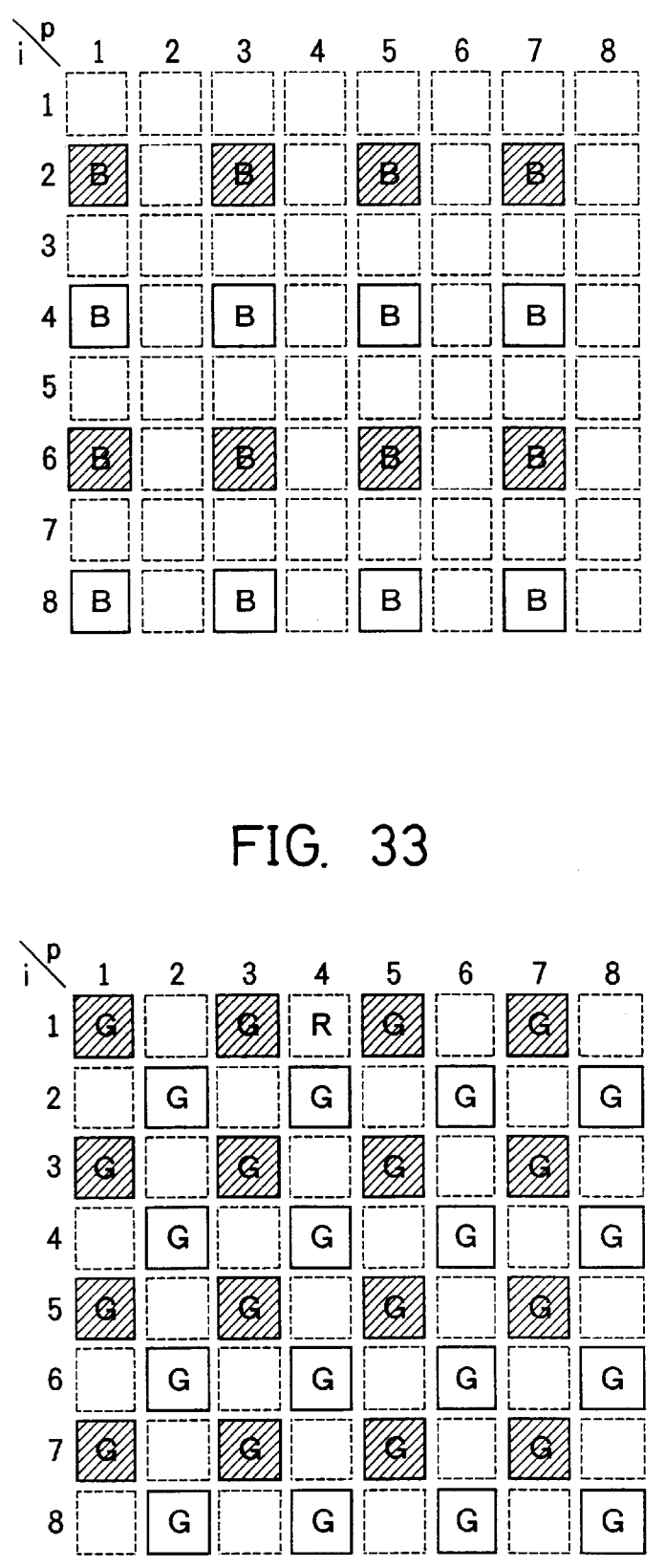

On the other hand, referring to FIG. 33, green pixel data are arranged in the intersections of odd lines and odd columns and the intersections of even lines and even columns. In the arrangement of green pixel image data, as shown in FIG. 33, the pixel image data Dc1 and the pixel image data Dc2 are alternately arranged along the column direction and the line direction.

To summarize the above, the image data Dc(i,p) pertaining to the boundary image Gc of FIG. 30 is represented by the following Equations (a3) to (d3)

$$Dc(i,p)=Dc2(i,p) \quad \text{Equation (a3)}$$

where the pixel position of Dc(i,p) is for the color component G, and $i=p=2\zeta+1(\zeta=0,1,2,\ldots)$ $$Dc(i,p)=Dc1(i,p) \quad \text{Equation (b3)}$$

where the pixel position of Dc(i,p) is for the color component G, and $i=p=2\zeta+2(\zeta=0,1,2,\ldots)$, $$(1)\ Dc(i,p)=Dc1(i,p) \quad \text{Equation (c3)}$$

where the pixel position of Dc(i,p) is for the color component R, and $i=4\zeta+1, p=2\zeta+2(\zeta=0,1,2,\ldots)$, $$(2)\ Dc(i,p)=Dc2(i,p)$$

where the pixel position of Dc(i,p) is for the color component R, and $i=4\zeta+3, p=2\zeta+2(\zeta=0,1,2,\ldots)$, $$(1)\ Dc(i,p)=Dc1(i,p) \quad \text{Equation (d3):}$$

where the pixel position of Dc(i,p) is for the color component B, and $i=4\zeta+2, p=2\zeta+1(\zeta=0,1,2,\ldots)$, $$(2)\ Dc(i,p)=Dc2(i,p)$$

where the pixel position of Dc(i,p) is for the color component B, and $i=4\zeta+4, p=2\zeta+1(\zeta=0,1,2,\ldots)$.

In this way, the color pixel image data Dc1 and the pixel image data Dc2 are alternately arranged with respect of each color in the column or line direction. In this synthesizing manner, similar to the arrangement of FIG. 28, the density gap in the boundary portion C between the left boundary image Gc1 and the right boundary image Gc2 becomes insignificant.

Third Synthesizing Manner

In the second synthesizing manner, pixel image data Dc1 and pixel image data Dc2 are joined in the form of a matrix block by block or pixel by pixel to generate the boundary image Gc. In this synthesizing manner, a boundary image Gc is divided into a plurality of sections. In each section, pixel image data Dc1 and pixel image data Dc2 are joined one another. Specifically, the density gap in the boundary portion C is reduced by setting, for each section, a data occupational area ratio between the area (pixel number) occupied by image data Dc1 of the left boundary image Gc1 and the area (pixel number) occupied by image data Dc2 of the right boundary image Gc2, and an arrangement of image data Dc1 and image data Dc2 in the section.

In this synthesizing manner, there are two methods to synthesize image data Dc1 and image data Dc2 in each section.

One method is to divide the boundary portion C into two sections (left section and right section) in the line direction. In this method, there can be considered three dividing lines, that is, a center dividing line between the left section and the right section, a left dividing line between the left image G1 and the left section of the boundary portion C, and a right dividing line between the right image G2 and the right section of the boundary portion C.

In the left section, the number of pixels bearing image data Dc1 pertaining to the left boundary image Gc1 in a block is N1, and the number of pixels bearing image data Dc2 pertaining to the right boundary image Gc2 in the same block is N2. The pixel number ratio of N1/N2 is larger in a block nearer to the left dividing line than a block to the center dividing line. Further, in the same block, image data Dc1 are arranged larger in an area nearer to the left dividing line than image data Dc2.

On the other hand, in the right section, the pixel number ratio of N2/N1 is larger in a block nearer to the right dividing line than a block to the center dividing line. Further, in the same block, image data Dc2 are arranged larger in an area nearer to the right dividing line than image data Dc1.

Figure 34:
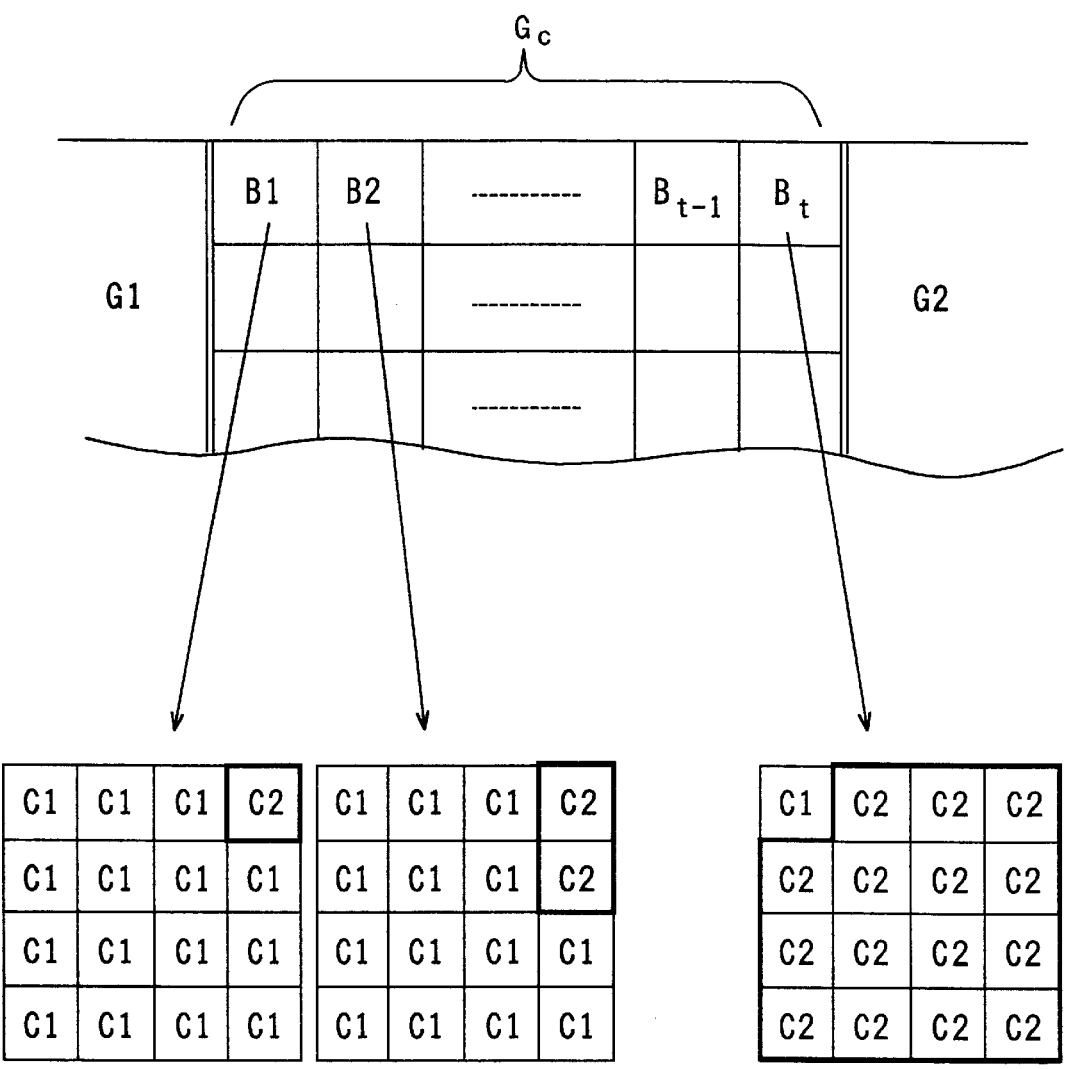
FIG. 34 is a diagram showing a third boundary image generation.

FIG. 34 is a diagram showing a case where one block consists of 16 pixels (4×4). In the block B1 nearest to the left dividing line or the left image G1, N1=15 and N2=1. Image data C2 pertaining to the right boundary image Gc2 is arranged at the uppermost right end pixel position in the block B1.

In the block B2 right to the block B1, N=14 and N2=2. Two pixel image data C2 pertaining to the right boundary image Gc2 are arranged at the uppermost right end pixel and the pixel position just therebelow in the block B2.

In the block Bt nearest to the right dividing line or the right image G2, N2=15 and N1=1. Image data C1 pertaining to the left boundary image Gc1 is arranged at the uppermost left end pixel in the block Bt.

In FIG. 34, C1 is the image data Dc1 pertaining to the left boundary image Gc1, and C2 is the image data Dc2 pertaining to the right boundary image Gc2. As is clear from FIG. 34, the blocks in the left section and the blocks in the right section are symmetrical with one another with respect to the center dividing line but image data C1 arranged on the cells of the blocks in one section are reversed by image data C2 arranged on the cells of the blocks in the other section.

The other method in this synthesizing manner is described with reference to FIG. 35. In this method, the number of pixel image data Dc2 per block is larger and the number of pixel image data Dc1 per block is smaller in a block nearer the right dividing line than in a block nearer the left dividing block. In other words, pixel image data Dc1 are replaced with pixel image data Dc2 as the blocks advance nearer the right dividing line. The image data replacement is carried out at random.

FIG. 35 is a matrix table showing the order of replacement according to which the image data Dc1 is replaced by the image data Dc2 in one block. In the table, the number in each cell denotes the replacement order. The matrix table of FIG. 35 consists of 16 pixels (4×4) in one block in the case where the boundary portion C has 64 pixels in the line direction. In other words, this matrix table is applied to the case where the boundary image Gc is divided into 16 blocks in the line direction.

Similar to the arrangement of FIG. 34, let it be assumed that there are 16 blocks B1, B2, . . . , B15, B16 throughout the boundary portion C from left to right. In the blocks B1 to B16, the image data Dc1 is replaced by the image data Dc2 in the order shown in the table of FIG. 35.

FIG. 36 exemplarily shows the arrangement of the block B8 located in the middle of the boundary portion C. In FIG. 36, the letters C1 represents the image data Dc1 pertaining to the left boundary image Gc1, and the letters C2 represents the image data Dc2 pertaining to the right boundary image Gc2. As shown in FIG. 36, in the block B8, the image data C1 and the image data C2 are alternately arranged in the line and column directions in a matrix, and the number of image data C1 is the same as that of image data C2.

FIG. 37 is a matrix table corresponding to FIG. 35 in the case where the above second method is applied to a single plate color image pickup device of Bayer system. In FIG. 37, cells given with the letter (R), (G), or (B) denote red, green, or blue pixel image data. The number in the cell denotes the order of replacement.

Referring to FIG. 37, replacement is done from the periphery toward the center of a block in the order of G, G, R, and B. For example, the blocks B2, B8 are respectively shown in FIGS. 38, 39.

It should be noted that the color replacement order may be other than the above-mentioned one or the order of G, G, R, and B. For example, there are the order of G, R, B, G, and the order of R, B, G, G. There are twelve types of color replacement order, including the order shown in FIG. 37.

Fourth Synthesizing Manner

Figure 40:
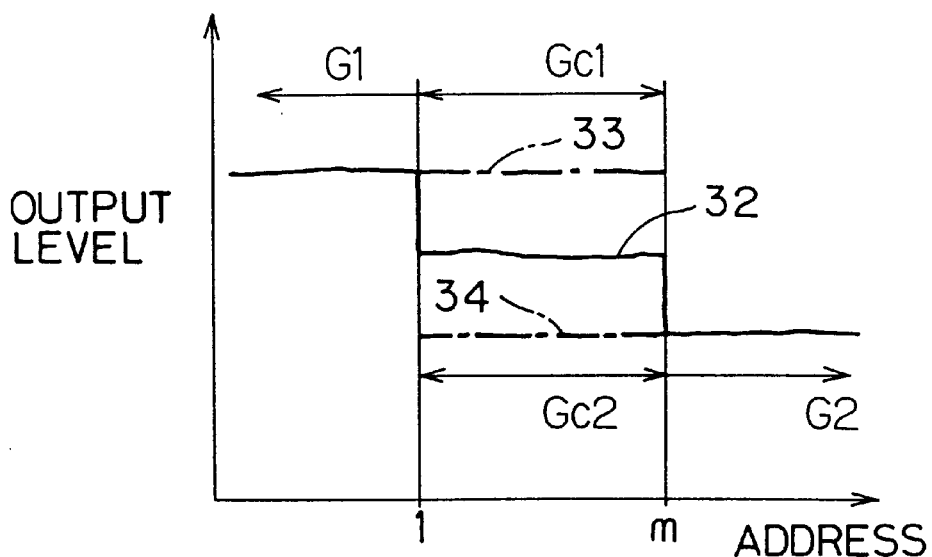
FIG. 40 is a diagram showing an output level contour of boundary images generated according to a fourth boundary image generation.

Next, described is a fourth synthesizing manner to generate a boundary image Gc with reference to FIG. 40. FIG. 40 is a diagram showing an output level of image data pertaining to a boundary image Gc. The horizontal axis denotes pixel addresses in the line direction, addresses 1 to m of the boundary image Gc in the line direction. The vertical axis denotes the output level of image data at a corresponding address. The solid line 32 represents a contour of output level of image data in the case of the left image G1 and the right image G2 being joined. The broken line 33 represents a contour of output level of image data Dc1 pertaining to the left boundary image Gc1. The broken line 34 represents a contour of output level of image data Dc2 pertaining to the left boundary image Gc2.

According to this synthesizing manner, an average output level of the pixel image data Dc1(i,p) pertaining to the left boundary image Gc1 and the pixel image data Dc2(i,p) pertaining to the right boundary image Gc2 is calculated to generate image data Dc(i,p) pertaining to the boundary image Gc. In other words, Dc(i,p) is calculated as follows:

$$Dc(i,p)=\{Dc1(i,p)+Dc2(i,p)\}/2, p=1,2,\ldots m$$

In this synthesizing manner, the image data Dc1, Dc2 are simply added and divided by the number of pixels to obtain an average level. Accordingly, the generation of the boundary image Gc is simplified. However, there is a possibility that this manner cannot suppress the density gap in the boundary portion C to an unnoticeable level in the case where a difference between the left and right boundary image data is relatively great. For this reason, this synthesizing manner is effective in the case of the density gap being relatively small.

Fifth Synthesizing Manner

Figure 41:
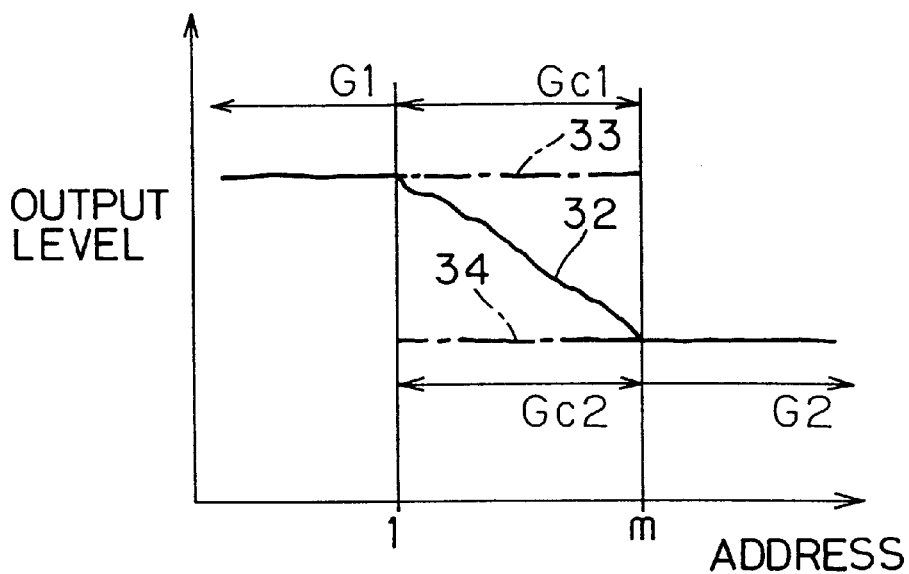
FIG. 41 is a diagram showing an output level contour of boundary images generated according to a fifth boundary image generation.

Next, a fifth synthesizing manner to generate a boundary image is described with reference to FIG. 41. FIG. 41 corresponds to FIG. 40 in which the same numbers have the same denotations, and accordingly, a description on FIG. 41 is omitted. In this synthesizing manner, the weighted average of image data Dc1(i,p) and image data Dc2(i,p) is calculated to generate image data Dc(i,p) in such a manner as to smoothly vary the output level or density over the boundary image Gc and borders between the left image G1 and the boundary image Gc and between the right image G2 and the boundary image Gc.

In the case that the weighting factor or coefficient for image data Dc1(i,p) is w1(i,p), and the weighting factor for image data Dc2(i,p) is w2(i,p), image data Dc(i,p) at a pixel position (i,p) is calculated as:

$$Dc(i,p)=\{w1(i,p)\cdot Dc1(i,p)+w2(i,p)\cdot Dc2(i,p)\}$$

In this case, the number of pixel m in the boundary image Gc in the line direction is preferably set as: $m=2^n$ to simplify calculation. For example, if the number of pixel m is $2^6=64$, the respective weighting factors w1(i,p), w2(i,p) are calculated as follows:

$$w1(i,p)=(65-p)/65, w2(i,p)=p/65, p=1,2,\ldots 64$$

Accordingly, image data Dc(i,p) is calculated in the following equation:

$$Dc(i,p)=\{(65-p)\cdot Dc1(i,p)+p\cdot Dc2(i,p)\}/65$$

For more simplification, the following equation may be adopted:

$$Dc(i,p)=\{(64-p)\cdot Dc1(i,p)+p\cdot Dc2(i,p)\}/64$$

Sixth Synthesizing Manner

Figure 42:
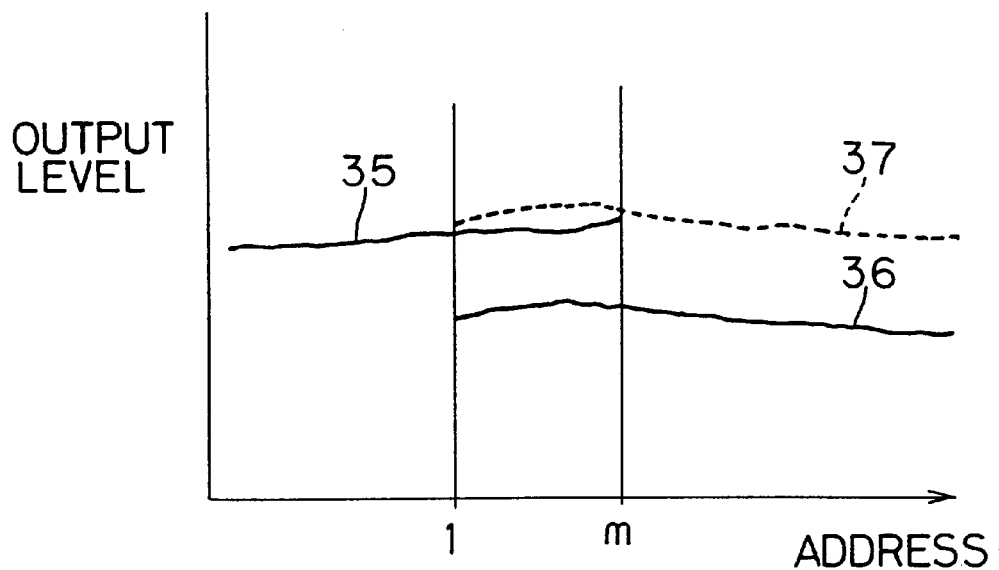
FIG. 42 is a diagram showing an output level contour of boundary portions of two image pickup devices.
Figure 43:
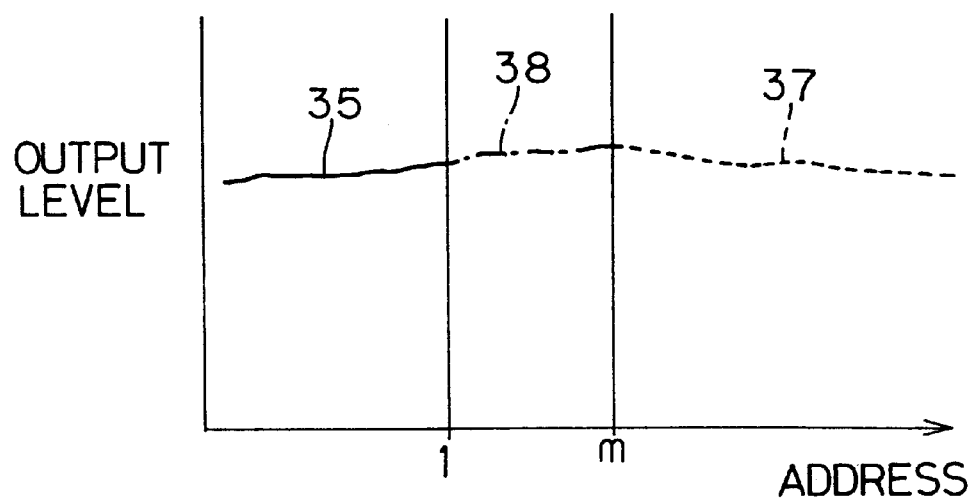
FIG. 43 is a diagram showing an output level contour of a synthesized image after the output level of the image pickup devices is adjusted in the sixth boundary image generation.
Figure 44:
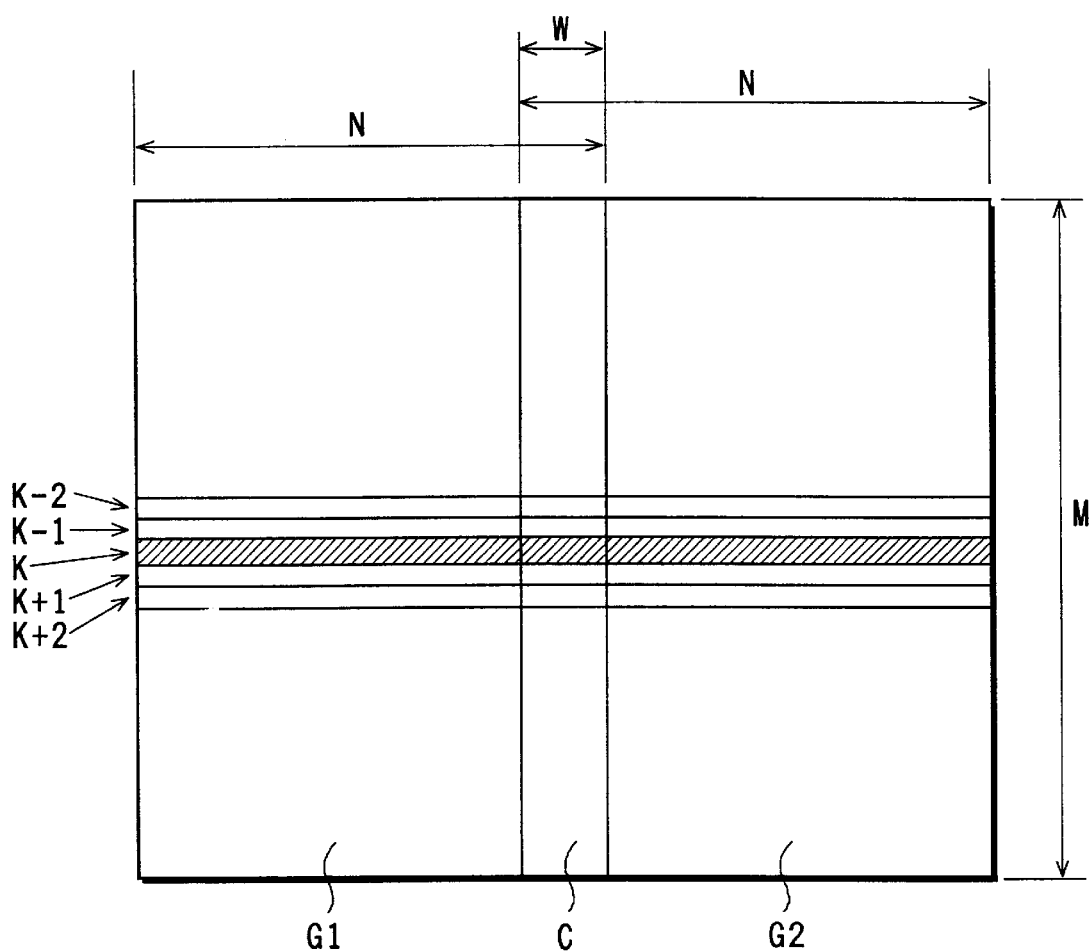
FIG. 44 is a diagram showing a calculation of a magnification coefficient K for adjusting the output level line by line using image data in several lines including a target line.

Next, described is a sixth synthesizing manner to generate a boundary image Gc with reference to FIGS. 42 to 44. FIG. 42 is a diagram showing an output level contour of image data in the boundary portion C which are sensed by the image pickup devices 12, 13. FIG. 43 is a diagram showing an output level contour of adjusted image data in the boundary image Gc.

In FIGS. 42 and 43, the solid line 35 denotes a contour of output level of image data obtained by the image pickup device 12, and the solid line 36 denotes a contour of output level of image data obtained by the image pickup device 13. The dotted line 37 denotes an output level contour of image data adjusted so that an average output level of the image data pertaining to the right image G2 substantially equal to that of image data pertaining to the left image G1.

In FIG. 43, the broken line 38 denotes a contour of output level of image data pertaining to a boundary image Gc. The image data of the boundary image Gc is generated by calculating an average of output level of image data Dc1 pertaining to a left boundary image Gc1 and output level of image data Dc2' pertaining to a right boundary image Gc2 of the above-adjusted image data of the right image G2. The average of output level of image data Dc1 and output level of image data Dc2' may be a simple average as the fourth synthesizing manner, or may be a weighted average as the fifth synthesizing manner.

The fourth and fifth synthesizing manners are conducted to suppress the density gap between the left image G1 and the right image G2 as small as possible, but are not effective in the case that the density difference between the left and right images G1 and G2 is considerably large.

In this synthesizing manner, on the other hand, the output level of image data Dc2 pertaining to the right boundary image Gc2 is adjusted so as to have an average equal to the average of output level of image data Dc1 pertaining to the left boundary image Gc1. Thereafter, the image data Dc1 and adjusted image data Dc2 are joined by calculating an average between their respective output levels. This can eliminate a difference between the sensitivity or characteristic performance of the optical system of the image pickup device 12 and those of the image pickup device 13.

Specifically, an average level Va of image data Dc1(i,p) (p=1,2, ... m) is defined as follows:

$$Va=\{Dc1(i,1)+Dc1(i,2)+ \ldots +Dc1(i,m)\}/m,$$

and an average level Vb of image data Dc2(i,p)(p=1,2, ... m) is defined as follows:

$$Vb=\{Dc2(i,1)+Dc2(i,2)+ \ldots +Dc2(i,m)\}/m.$$

Then, the output level contour 37 in FIG. 42 is represented by Va/Vb·D2(i,j)(j=1,2, ... m, ... N) where D2(i,j) is all the image data on the i-th line outputted from the image pickup device 13.

In this way, adjusting the output level of image data D2(i,j) on the i-th line which is obtained by the image pickup device 13 eliminates the sensitivity difference between the right image G2 sensed by the image pickup device 13 and the left image G1 sensed by the image pickup device 12. Thereafter, image data Dc2(i,j)' (=(Va/Vb)·Dc2(i,j)) pertaining to the right boundary image Gc2 after the level adjustment and image data Dc1(i,j) pertaining to the left boundary image Gc1 are synthesized. In this way, the density gap in the boundary portion C is eliminated (see FIGS. 40, 41 and 43).

In FIGS. 42 and 43, the output level of image data pertaining to the right image G2 sensed by the image pickup device 13 is adjusted to the same as that of image data pertaining to the left image G1 sensed by the image pickup device 12. Conversely, the output level of image data pertaining to the left image G1 may be adjusted to the same as that of image data pertaining to the right image G2. Alternatively, the output level of the respective image data pertaining to the left image G1 and the right image G2 may be adjusted individually to a certain level.

In FIG. 43, the average value is calculated to generate the image data Dc pertaining to the boundary image Gc. The image data Dc may be generated according to one of the above-mentioned manners.

In FIGS. 42 and 43, calculation of adjustment coefficient K(=Va/Vb) is conducted each line. However, there is a likelihood that line noise occurs in such adjusted image data. To eliminate such line noise, the following method may be executed as shown in FIG. 44.

Specifically, as shown in FIG. 44, an average level Va' of image data Dc1(i,p)(p=1,2, ... m) and an average level Vb' of image data Dc2(i,p) (p=1,2, ... m) are calculated in a zone of a given line, two lines just above the given line, and two lines just below the given line, and adjustment coefficient K' (=Va'/Vb') is calculated based on calculated average levels Va', Vb' to eliminate the likelihood of line noise.

Assuming that average levels of image data Dc(i,p) (p=1, 2, ... m) in the respective K−2)-th, K−1)-th, k-th, (k+1)-th, (k+2)-th lines are VaK−2), VaK−1), Va(k), Va(k+1), Va(k+2), and average levels of image data Dc2(i,p) (p=1,2, ... m) in the corresponding lines are VbK−2), VbK−1), Vb(k), Vb(k+1), Vb(k+2), an adjustment coefficient K' in the k-th line is calculated in accordance with Equation (5):

$$K'=\{Va(k-2)+Va(K-1)+Va(k)+Va(k+1)+Va(k+2)\}\div\{Vb(K-2)+Vb(K-1)+Vb(k)+Vb(k+1)+Vb(k+2)\} \quad (5)$$

where $$Va(i)=\{Dc1(i,1)+Dc1(i,2)+ \ldots +Dc1(i,m)\}/m$$

$$Vb(i)=\{Dc2(i,1)+Dc2(i,2)+ \ldots +Dc2(i,m)\}/m$$

$$i=k,\ k\pm1,\ k\pm2$$

Figure 45:
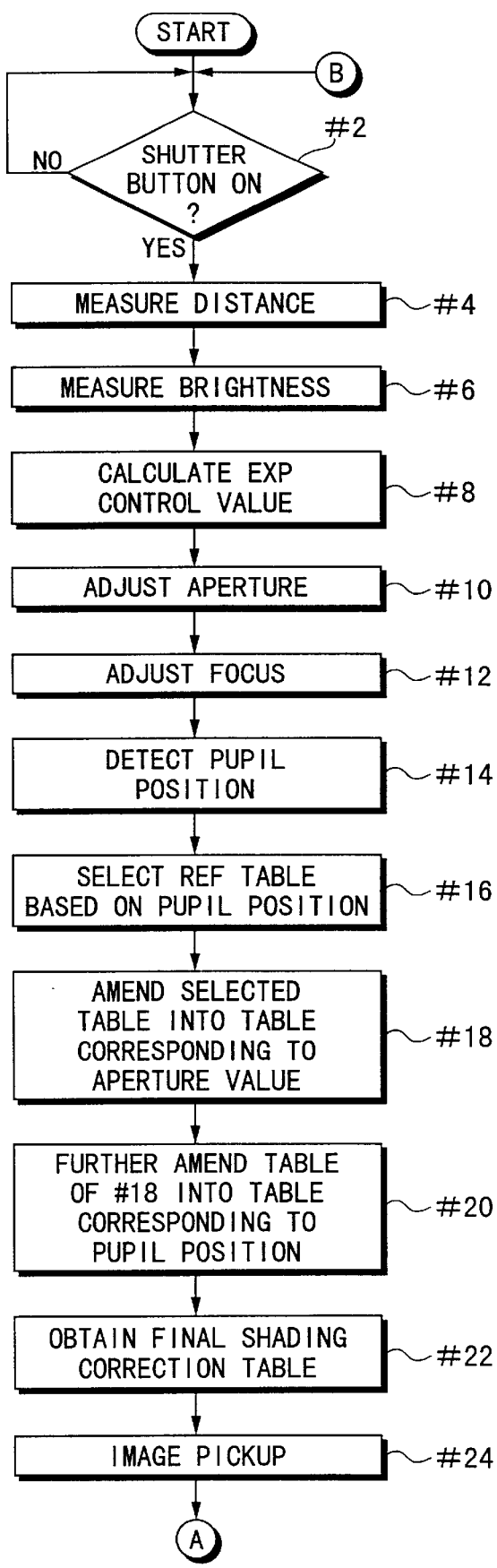
FIGS. 45 and 46 are a flowchart showing a photographing operation of the camera.
Figure 46:
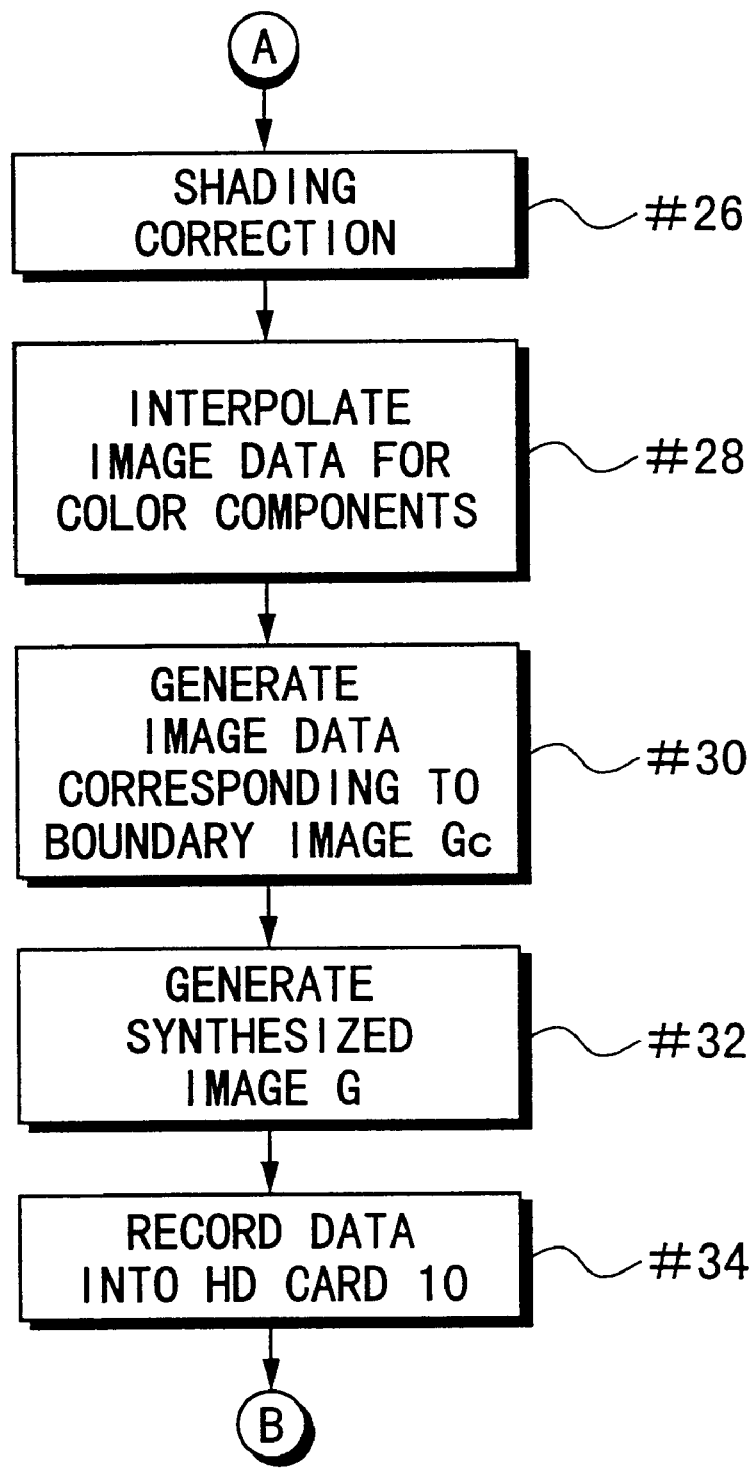

Next, a photographing operation of the electronic camera is described with reference to flowcharts of FIGS. 45 and 46.

First, a main switch of the electronic camera 1 is turned on to start up the camera 1, and the camera 1 comes into a photographing enable state (the loop of Step #2). When a photographer operates the shutter button 9 to generate a signal indicative of instructing photographing(YES in Step #2), the distance metering device 21 measures an object distance to generate object distance data based on which a focal control value for the taking lens 2 is calculated (in Step #4).

The light metering device 22 measures a brightness of the object to generate object brightness data (in Step #6). An exposure control value (aperture value and shutter speed) is calculated based on the object brightness data (in Step #8).

Subsequently, a calculated aperture value is outputted to the diaphragm drive controller 17 to adjust the aperture of the diaphragm 15, while calculated shutter speed is outputted to the CCD drive controller 18 (in Step #10). The calculated focal control value is outputted to the lens drive controller 16 to move the focusing lens of the taking lens 2 for focus adjustment (in Step #12).

Next, the pupil position of the taking lens 2 is calculated based on kind of the taking lens 2, a focal distance, and a lens displacement (in Step #14). Reference correction tables for the image pickup devices 12, 13 are respectively selected and read out from the ROM 23 based on the calculation results (in Step #16). The four reference correction tables for the cases (A) to (D) are stored in the ROM 23 corresponding to the image pickup devices 12, 13. In the case where the pupil position is near the sensing surface of the image pickup device 12 (13), the reference correction tables for the case (A) shown in FIG. 16 and the case (C) shown in FIG. 18 are selected. In the case where the pupil position is far from the sensing surface, the reference table for the case (B) shown in FIG. 17 and the case (D) shown in FIG. 19 are selected.

A selected reference correction table is amended into a shading correction table corresponding to the detected aperture of the diaphragm 15 (in Step #18), and this shading correction table is further amended into a shading correction table corresponding to the detected pupil position of the taking lens 2 (in Step #20).

Further, a final shading correction is obtained by multiplying the above-amended shading correction table and a correction table for compensating for a difference of the photoelectric conversion characteristic between the image pickup devices 12 and 13 (in Step #22).

The image pickup devices 12, 13 are driven for a predetermined period (integration time corresponding to the shutter speed) to pick up an object image (in Step #24). The analog signal processor 191 applies the predetermined signal processing to an image signal pertaining to a left image G1 sensed by the image pickup device 12 and an image signal pertaining to a right image G2 sensed by the image pickup device 13 for each color of the color components R, G, B. Thereafter, the A/D converter 192 converts the processed analog signals to digital image data. The digital image data are stored in the image memory 193.

The shading corrector 194 applies a shading correction to the digital image data for each color using the shading correction table obtained in Step #22 (in Step #26). The image data interpolator 195 interpolates image data for pixel positions having no image data (in Step #28).

The image synthesizer 196 synthesizes a left boundary image Gc1 and a right boundary image Gc2 to generate a boundary image Gc which has an unnoticeable density gap (in Step #30). The image data pertaining to the boundary image Gc, and image data pertaining to a left image G1 and a right image G2 except the left and right boundary images Gc1, Gc2 are joined to generate image data pertaining to a synthesized image G corresponding to the entire object image (in Step #32).

The image data pertaining to the synthesized image G are outputted to the HD card 10 via the output I/F 197 and recorded therein (in Step #34). In this way, the photographing operation for one object image is completed, and the sequence returns to Step #2 to photograph a next object image.

In the foregoing embodiment, an object image is divided into two partial images, and two image pickup devices respectively pick up the partial images. According to the present invention, however, it may be appreciated to provide three or more image pickup devices to pick up three or more partial images of an object image.

Further, the present invention is applicable not only to the color photographing but to a monochromatic photographing.

Further, the present invention is applicable to a digital video camera.

As described above, in the electronic camera, an object light image is divided into partial light images, the partial light images are picked up by a plurality of image pickup devices, and the picked up partial light images are joined to produce a synthesized image representative of the entirety of the object image. The partial images overlap in a boundary portion. A boundary image is generated in such a manner as to reduce or eliminate a density gap between the partial images in the boundary portion. The partial images are joined along with the thus generated boundary image to produce a synthesized image. Since the density gap in the boundary portion becomes unnoticeable, an image quality deterioration of the synthesized image can be prevented.

The joining border of the partial image is made to have the form of a curve. Accordingly, the boundary image can be produced in a simple way.

Image data pertaining to a part of the boundary image is joined with image data pertaining to the other part of the boundary image pixel by pixel or block by block, the block consisting of two or more pixels, to generate the boundary image. Accordingly, the boundary image can be produced with a less density gap and in a simple manner.

Also, image data pertaining to a part of the boundary image is joined with image data pertaining to the other part of the boundary image using a predetermined weighting coefficient to produce the boundary image. Accordingly, the density gap between the partial images in the boundary portion can be smoothly varied over the entirety of the boundary image, thereby obtaining a synthesized image with an image congruity.

The boundary image is produced after setting an output level of image data pertaining to a part of the boundary image substantially equal to that of image data pertaining to the other part of the boundary image based on an average output level of these image data pertaining to the part of the boundary image and the other part of the boundary image. Accordingly, there can be assuredly reduced a density gap between the partial images in the boundary portion due to a sensitivity difference between the image pickup devices, thereby obtaining a synthesized image with a well-balanced density over the entirety of the image.

Before producing the synthesized image by joining the partial images outputted from the color image pick-up devices color by color, data interpolation is executed for each color component to supplement data at data-vacant pixel positions. Accordingly, there can be eliminated a possibility that color irregularities occur in the synthesized image due to a difference in sensitivity between the color image pickup devices.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image processing apparatus comprising:
   a plurality of image pickup devices which generate a plurality of partial image data pertaining to a plurality of partial light images of an object respectively, each image pickup device including an arrangement of a number of photoelectric conversion elements respectively attached with three primary color filters in a predetermined positional relationship;

an image data interpolator which performs interpolation of partial image data of each primary color generated by each image pickup device; and an image synthesizer which synthesizes the plurality of interpolated partial image data to generate image data pertaining to a single image of the object.

2. An image processing apparatus according to claim 1, wherein the number of photoelectric conversion elements are arranged in a matrix, and are respectively attached with three primary color filters in a predetermined positional relationship.

3. An image processing apparatus according to claim 1, wherein the image data interpolator performs:

interpolation of green image data based on green image data generated by each image pickup device;

interpolation of red image data based on green image data and red image data generated by each image pickup device; and interpolation of blue image data based on green image data and blue image data generated by each image pickup device.

4. An image processing apparatus comprising:

a plurality of image pickup devices which generate a plurality of partial image data pertaining to a plurality of partial light images of an object respectively, each image pickup device including a plurality of photoelectric conversion elements:

a memory which stores correction data for correcting a variation in the photoelectric conversion elements of each image pickup device;

an image data corrector which corrects a variation of output from each photoelectric conversion element within the partial image data generated by each image pickup device based on correction data stored in the memory;

an image synthesizer which synthesizes the plurality of corrected partial image data to generate image data pertaining to a single image of the object; and an optical system which introduces each partial light image onto the corresponding image pickup device, the optical system including a moveable lens for adjusting the introduction of each partial light image onto the image pickup device, wherein the memory further stores a plurality of correction data respectively corresponding to positions of the moveable lens.

5. An image processing apparatus comprising:

a plurality of image pickup devices which generate a plurality of partial image data pertaining to a plurality of partial light images of an object respectively, each image pickup device including a plurality of photoelectric conversion elements;

a memory which stores correction data for correcting a variation in the photoelectric conversion elements of each image pickup device;

an image data corrector which corrects a variation of output from each photoelectric conversion element within the partial image data generated by each image pickup device based on correction data stored in the memory;

an image synthesizer which synthesizes the plurality of corrected partial image data to generate image data pertaining to a single image of the object; and an optical system which introduces each partial light image onto the corresponding image pickup device, the optical system including a diaphragm for adjusting the light amount of each partial light image onto the image pickup device, wherein the memory further stores a plurality of correction data respectively corresponding to aperture areas of the diaphragm.

* * * * *